US008559029B2

(12) United States Patent
Yamaguchi et al.

(10) Patent No.: US 8,559,029 B2
(45) Date of Patent: Oct. 15, 2013

(54) PRINT SYSTEM AND PRINT CONTROL METHOD AND PRINTING APPARATUS AND PROGRAM THEREOF

(75) Inventors: Naohiro Yamaguchi, Kawasaki (JP); Kazuhiko Ushiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 578 days.

(21) Appl. No.: 12/489,926

(22) Filed: Jun. 23, 2009

(65) Prior Publication Data

US 2010/0002252 A1 Jan. 7, 2010

(30) Foreign Application Priority Data

Jul. 4, 2008 (JP) ................................. 2008-175907

(51) Int. Cl.
*G06K 15/00* (2006.01)

(52) U.S. Cl.
USPC ........ 358/1.14; 358/1.12; 358/1.13; 358/1.15

(58) Field of Classification Search
None
See application file for complete search history.

(56) References Cited

U.S. PATENT DOCUMENTS 7,545,523 B2 * 6/2009 Schmidt et al. .............. 358/1.14
7,567,360 B2 * 7/2009 Takahashi et al. ........... 358/1.15
2004/0190057 A1 9/2004 Takahashi et al.
2007/0069452 A1 * 3/2007 Murata et al. ................. 271/186
2007/0109586 A1 * 5/2007 Yamada et al. .............. 358/1.14
2007/0147855 A1 6/2007 Shimada
2007/0201071 A1 * 8/2007 Yamada et al. .............. 358/1.13
2007/0279679 A1 * 12/2007 Tanimoto ..................... 358/1.15
2008/0024807 A1 * 1/2008 Matsuda ....................... 358/1.12
2008/0068640 A1 * 3/2008 Todaka ......................... 358/1.14
2008/0174793 A1 * 7/2008 Mutsuno ........................ 358/1.6
2009/0040547 A1 * 2/2009 Ferlitsch ...................... 358/1.15

FOREIGN PATENT DOCUMENTS

JP 2005-210754 A 8/2005

OTHER PUBLICATIONS

Japanese Office Action issued in Japanese counterpart application No. JP2008-175907, dated Oct. 5, 2012.

* cited by examiner

*Primary Examiner* — Twyler Haskins
*Assistant Examiner* — Helen Q Zong
(74) *Attorney, Agent, or Firm* — Rossi, Kimms & McDowell LLP

(57) ABSTRACT

A print system having a printing apparatus and a post-processing apparatus, and a print control method thereof are capable of executing an inline job requiring printing by the printing apparatus and post-processing by the post-processing apparatus and an offline job that does not include print processing by the printing apparatus but requires post-processing by the post-processing apparatus, and allow a recovery process for carrying out unfinished processing in the inline job when the inline job is interrupted during execution thereof. On the other hand, if the offline job is interrupted, that offline job is canceled and, if there is a job that is unaffected by a cause of the interruption, execution of that job is allowed.

18 Claims, 18 Drawing Sheets

PRINT SYSTEM AND PRINT CONTROL METHOD AND PRINTING APPARATUS AND PROGRAM THEREOF

BACKGROUND OF THE INVENTION

1. Field of the Invention

The present invention relates to a print system and print control method that is provided with a printing apparatus and a post-processing apparatus (or “finisher”) and that is capable of executing an in-line job using the printing apparatus and the post-processing apparatus and an off-line job, which includes post-processing by the post-processing apparatus but does not include print processing by the printing apparatus, and a printing apparatus and program thereof.

2. Description of the Related Art

In recent years, a POD (print on demand) print system has been proposed (US Patent Publication No. 2004-0190057) that takes advantage of an electrophotographic printing apparatus and an inkjet printing apparatus in competition with a printing technology that uses a conventional printing plate. With such POD print system, offset plate making processes and other complicated tasks in conventional print system become unnecessary.

However, in assuming the practical use of products of such POD print system, there are still areas that remain to be investigated. For example, in conventional print system, there is no configuration for enabling use of post-processing by an inline post-processing apparatus connected to a printer (a post-processing apparatus for which a transport path for paper between the printer and the post-processing apparatus is physically connected) without accompanying printing by the printer. Accordingly, it is assumed that a print system is called for that enables use of post-processing by the post-processing apparatus connected to the printer without accompanying printing by the printer.

When attempting to enable an offline job, in which post-processing by the post-processing apparatus connected to the printer is carried out without accompanying print processing by the printer, to be executed in this print system, the following problems as indicated by (1) and (2) below are anticipated.

(1) In a case where a job whose processing is interrupted is an offline job, trouble is anticipated in that the processing of other jobs will be delayed. For example, consider a case where a problem has occurred during execution of an offline job in which only post-processing is carried out. In such case, if it is desired to execute another print job having only print processing without executing post-processing, there is a possibility that the print job can be executed regardless of the problem. Accordingly, in such case, it will be desired to execute the print job regardless of whether or not the cause of the problem in the offline job has been cleared.

(2) In a case where a post-processing job whose processing is interrupted is an offline job, trouble is anticipated to occur when the post-processing job is re-executed. For example, consider a post-processing offline job in which one set (copy) of printed materials (printed sheet) constituted by 10 sheets is stapled and five sets (copies) are produced. At this time, if the offline job is interrupted for some reason during feeding of a 25th sheet of paper, bundles of two sets of stapled sheets of paper and five sheets of paper that have been fed and stacked for stapling will be present inside the print system, and 25 sheets of paper not yet fed will be present in the sheet feeding trays. In order to restart the stapling process in this state, it is necessary to return the five sheets that have been stacked prior to stapling to the sheet feeding trays of the print system, then reset the stapling process settings to match conditions such as the number of these sheets and then to restart the stapling process. Such operations are extremely troublesome, and in a case where there are many sheets or sets of paper, or where the settings are complicated, it can be easily envisioned that appropriately carrying out the settings for re-execution will be extremely difficult.

SUMMARY OF THE INVENTION

An aspect of the present invention is to eliminate the above-mentioned problems with the conventional technology.

A feature of an invention of the present application is preventing occurrences of problems when execution of an offline job is interrupted in a print system that is capable of executing an in-line job, which is carried out by a printing apparatus and a post-processing apparatus working in cooperation, and an off-line job, which includes post-processing by the post-processing apparatus but does not include print processing by the printing apparatus.

According to an aspect of the present invention, there is provided a print system having a printing apparatus and a post-processing apparatus, comprises: a post-process execution unit that, if an offline job execution request that does not require print processing by the printing apparatus but requires post-processing by the post-processing apparatus has been received, causes the post-processing apparatus to execute the post-processing on printed materials that have been prepared in advance for the offline job, an inline job control unit that, if an inline job execution request that requires printing by the printing apparatus and post-processing by the post-processing apparatus has been received, executes the inline job by controlling the printing apparatus and the post-processing apparatus in accordance with the inline job, and a recovery control unit that, in a case where the offline job or the inline job is interrupted, allows a recovery process for carrying out unfinished processing in the inline job if the interrupted job is the inline job, and prohibits the recovery process if the interrupted job is the offline job.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
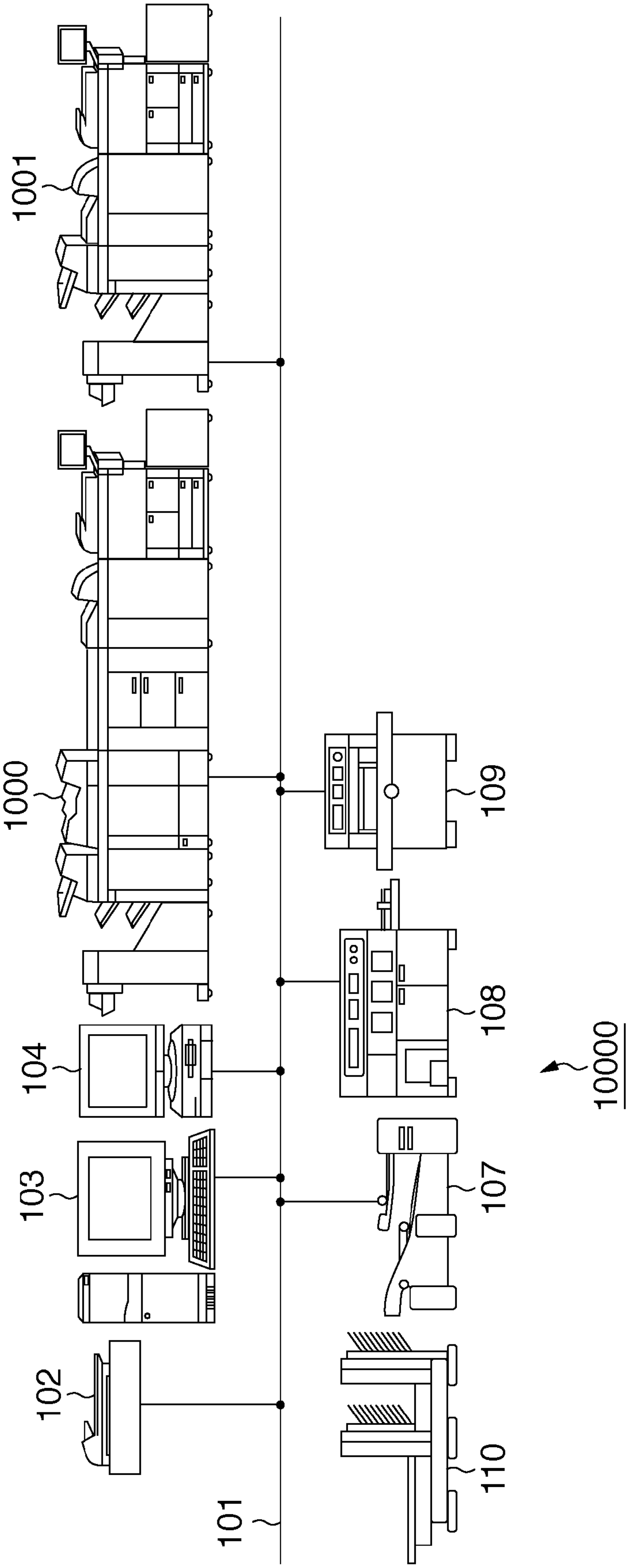
FIG. 1 is a configuration diagram of a POD system according to an exemplary embodiment of the present invention.

FIG. 1 is a configuration diagram of a POD system according to an exemplary embodiment of the present invention.

A POD system 10000 is provided with print systems 1000 and 1001, a scanner 102, a server computer (PC) 103, and a client computer (PC) 104, and these are connected via a network 101. Furthermore, the POD system 10000 is provided with a sheet folding apparatus 107, a case binding apparatus 108, a trimmer 109, and a saddle stitching apparatus 110 and the like.

Figure 2:
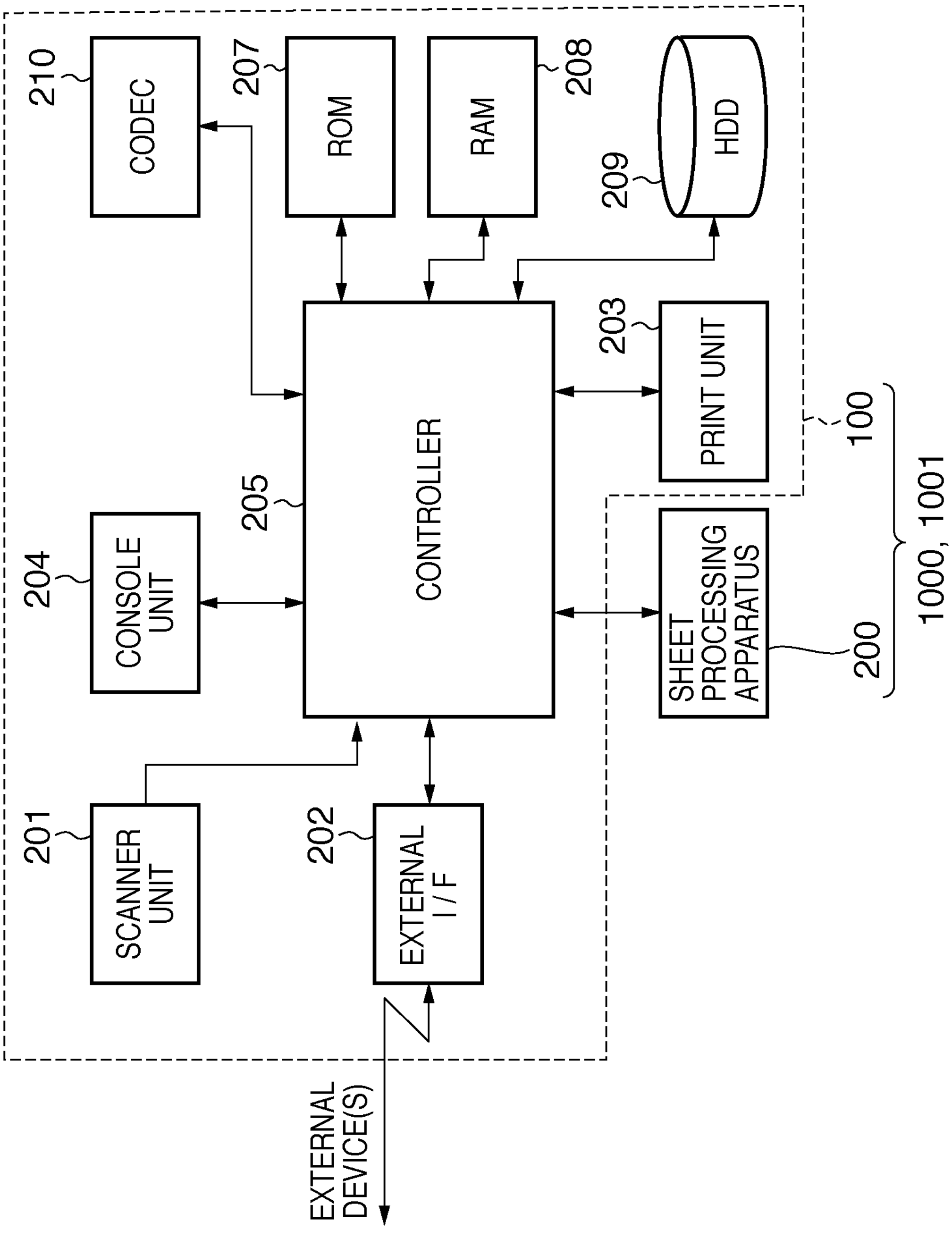
FIG. 2 is a block diagram describing a configuration of a print system according to the present exemplary embodiment.

The print systems 1000 and 1001 are respectively provided with a printing apparatus 100 and a sheet processing apparatus 200 as shown in FIG. 2. It should be noted that the present exemplary embodiment is described using a multifunctional peripheral (MFP), which has multiple functions such as a copy function and a printer function, as an example of the printing apparatus 100. However, the printing apparatus 100 may also be a single function printing apparatus having only a copy function or a printer function. The PC 103 manages data exchanges among the various apparatuses connected by the network 101. The PC 104 sends image data via the network 101 to the printing apparatus 100 and the PC 103. The sheet folding apparatus 107 carries out folding processes of the sheets that have been printed on by the printing apparatus 100. The case binding apparatus 108 carries out case binding processes on the sheets that have been printed on by the printing apparatus 100. The trimmer 109 carries out cutting processes on the sheets that have been printed on by the printing apparatus 100 for each bundle of sheets constituted by multiple sheets. The saddle stitching apparatus 110 carries out saddle stitching processes on the sheets that have been printed on by the printing apparatus 100. Here, when using the sheet folding apparatus 107, the case binding apparatus 108, the trimmer 109, or the saddle stitching apparatus 110, the user removes the sheets that have been printed on by the print system 1000 or the print system 1001 and sets the sheets in any of these apparatuses to execute processing by that apparatus. Furthermore, other than the saddle stitching apparatus 110, the multiple apparatuses provided in the POD system 10000 are connected to the network 101 and are configured to be capable of data communication with the other apparatuses.

It should be noted that although the print system 1001 is equipped with equivalent systems with which the print system 1000 is equipped, there is no limitation to this. Furthermore, the configuration of the present exemplary embodiment can be achieved if at least one of the print systems 1000 and 1001 is present. In the present exemplary embodiment, the print system 1000 or the print system 1001 is equipped with the various components described below as an example.

Next, description is given of a configuration of the print system 1000 (or 1001).

FIG. 2 is a block diagram describing a configuration of a print system according to the present exemplary embodiment.

Of the units shown in FIG. 2, units other than the sheet processing apparatus 200 are included in the printing apparatus 100. Any number of sheet processing apparatuses 200 can be connected to the printing apparatus 100. This print system is configured so that sheet processing on the sheets that have been printed on by the printing apparatus 100 can be executed by the sheet processing apparatus 200 connected to the printing apparatus 100. However, it is also possible for the print system 1000 to be configured with only the printing apparatus 100 and without being connected to the sheet processing apparatus 200. The sheet processing apparatuses 200 can further execute sheet processing on sheets that have been printed on by a printing apparatus other than the printing apparatus 100.

The sheet processing apparatus 200 is configured to be capable of communication with the printing apparatus 100 and can execute sheeting processing, which is described later, by receiving instructions from the printing apparatus 100. A scanner unit 201 reads an image on an original and converts the image to image data then transfers the image data to the other units. An external I/F 202 carries out data exchanges with other apparatuses connected to the network 101. A print unit 203 prints images on the sheets based on the inputted image data. A console unit 204 is provided with a hard key input section (key-input section) 402 and a touch panel section 401, which are described later with reference to FIG. 4, and receives instructions from the user via the sections. The console unit 204 carries out various displays on the touch panel provided on the console unit 204.

A controller 205 comprehensively controls the processing and operations and the like of each of the units provided in the print system. That is, it controls the operations of both the printing apparatus 100 and the sheet processing apparatus 200 connected to the printing apparatus 100. A ROM 207 stores various computer programs to be executed by the controller 205. For example, the ROM 207 stores programs for the controller 205 to execute various processes of flowcharts to be described later, and display control programs that are necessary for displaying various setting screens to be described later. Furthermore, the ROM 207 stores a program for executing an operation in which PDL (page description language) code received from the PC 103 or PC 104 or the like is analyzed by the controller 205 and rendered into raster image data. Additionally, the ROM 207 stores information such as a boot sequence and font information. A RAM 208 stores image data sent from the scanner unit 201 and the external I/F 202, as well as various programs and settings information loaded from the ROM 207. Furthermore, the RAM 208 stores information relating to the sheet processing apparatus 200 (information relating to a number (0 to n apparatuses) of sheet processing apparatuses 200 connected to the printing apparatus 100 and functions of each of the sheet processing apparatuses 200, as well as a connection sequence of the sheet processing apparatuses 200). A HDD (hard disk drive) 209 is constituted by a hard disk and drive units or the like that carry out reading and writing of data to the hard disk. The HDD 209 is a large capacity storage device for storing image data that has been inputted from the scanner unit 201 or the external I/F 202 and compressed by a compression-expansion unit (codec) 210. Based on instructions from the user, the controller 205 can print the image data stored in the HDD 209 using the print unit 203. Furthermore, based on instructions from the user, the controller 205 can send the image data stored in the HDD 209 to external devices such as the PC 103 or other print systems via the external I/F 202. Furthermore, the controller 205 can obtain image data from external devices such as the PC 103 or other print systems via the external I/F 202. Furthermore, via the external I/F 202, the controller 205 can search external devices connected to the network 101. The codec 210 carries out compression and expansion operations of data such as image data stored in the RAM 208 and the HDD 209 using various compression formats such as JBIG and JPEG.

Figure 3:
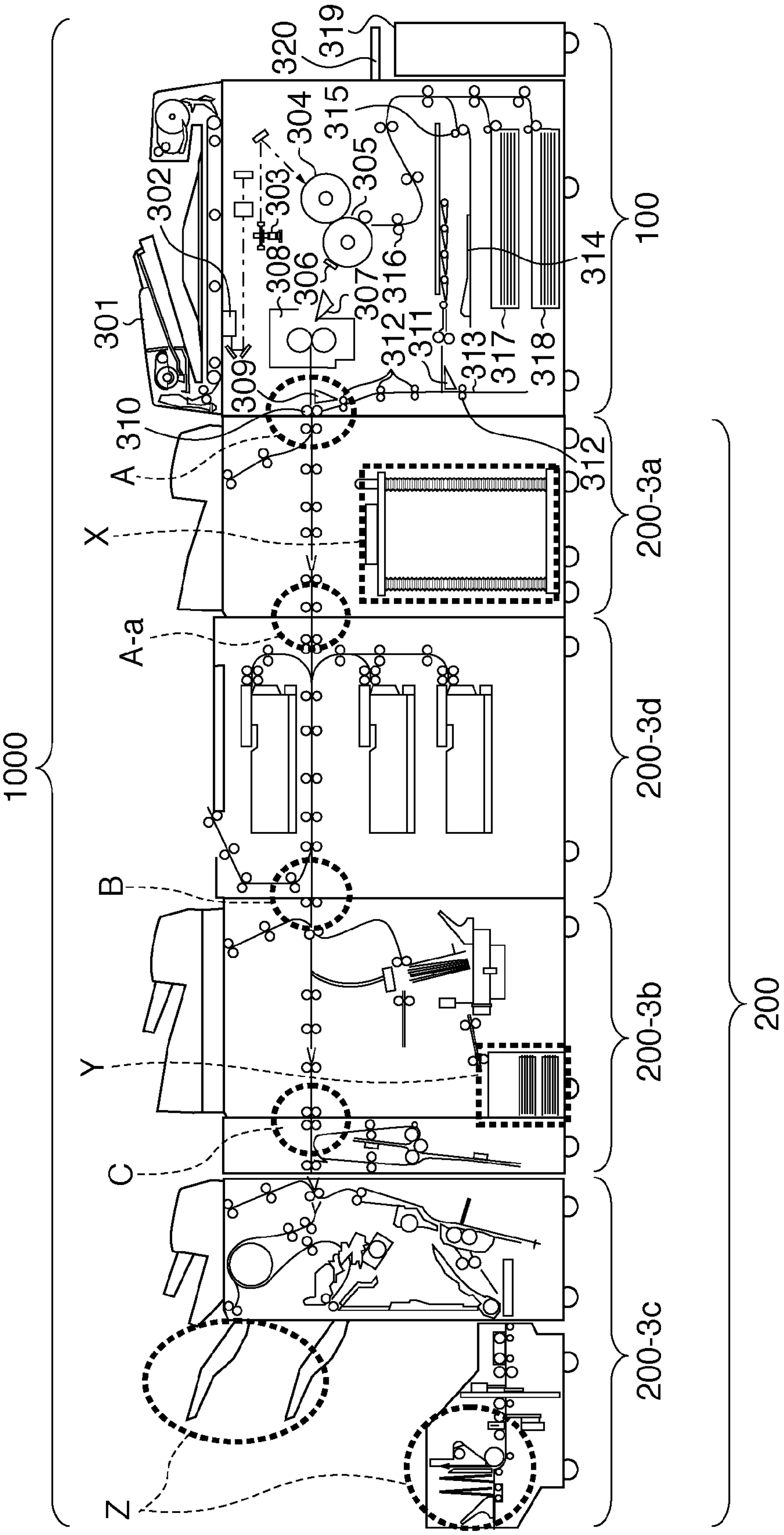
FIG. 3 depicts a cross-sectional view of a printing apparatus and a sheet processing apparatus connected to the printing apparatus in a print system according to the present exemplary embodiment.

Next, description is given using FIG. 3 of a configuration of the print system 1000.

FIG. 3 depicts a cross-sectional view of a printing apparatus and a sheet processing apparatus connected to this printing apparatus in a print system according to the present exemplary embodiment.

An auto document feeder (ADF) 301 separates, in order of page order from a first original, originals that have been set in a tray, and transports these onto a platen glass to be scanned by a scanner 302. The scanner 302 reads an image of the original that has been transported onto the platen glass and converts the image to image data using a CCD. A light ray such as a laser light for example, which is modulated in response to the image data, is made incident on a polygonal mirror 303 and irradiated via a reflector mirror onto a photosensitive drum 304 as a reflected scanning light to form an electrostatic latent image corresponding to the image data. The electrostatic latent image is developed by a toner and transferred to a sheet that is sticking onto a transfer drum 305. A full color image is formed on the sheet by successively executing this series of image formation processes for toner of yellow (Y), magenta (M), cyan (C), and black (K). After the four times of these image formation processes, the sheet on the transfer drum 305 on which a full color image has been formed is separated by a separation pawl 306 then transferred to a fixing unit 308 by a pre-fixing conveyance unit 307. The fixing unit 308 is includes a roller and belt combination, has an inbuilt heat source such as a halogen heater, and uses heat and pressure to melt and fix the toner on the sheet onto which the toner image has been transferred. A discharge flapper 309 is configured capable of swinging centered on a swinging shaft and prescribes a transport direction of the sheets. When the discharge flapper 309 has swung in a clockwise direction in the diagram, the sheets are transported in a straight line and discharged outside the apparatus by discharge rollers 310. Through the above series of sequences, the controller 205 controls the printing apparatus 100 so as to execute single-sided printing.

On the other hand, in a case of forming images on both sides of the sheets, the discharge flapper 309 is rotated in a counterclockwise direction in the diagram such that route of the sheets discharged from the fixing unit 308 is altered downward and the sheets are fed into a double-sided conveyance unit. The double-sided conveyance unit is provided with a reversing flapper 311, reversing rollers 312, a reversing guide 313, and a double-sided print tray 314. The reversing flapper 311 rotates centered on a swinging shaft to prescribe the transport direction of the sheets. In a case of executing a double-sided print job, the controller 205 rotates the reversing flapper 311 in a counterclockwise direction in the diagram such that a sheet on which printing has been performed on a first side is fed to the reversing guide 313 via the reversing rollers 312. Then, the rotation of the reversing rollers 312 is temporarily stopped when the trailing edge of the sheet has passed the reversing flapper 311 and is being sandwiched by the reversing rollers 312, after which the reversing flapper 311 is rotated in the clockwise direction in the diagram and the reversing rollers 312 are caused to rotate in a reverse direction. In this way, control is performed such that the sheet present at the reversing guide 313 is switched back and transported such that the trailing edge and leading edge of the sheet are swapped, and the sheet is guided to the double-sided print tray 314. The sheet whose first side has been printed on is temporarily stacked in the double-sided print tray 314, after which the sheet is again fed into registration rollers 316 by re-feed rollers 315. The side (second side) opposite to the first side of the sheet at this time is fed so as to be facing the photosensitive drum 304. Then, a second image is formed on the second side of the sheet in a same manner as the processes described above. In this way images are formed on both sides of the sheet and, by way of fixing processes, the sheet is discharged from inside the main unit of the printing apparatus 100 to outside the apparatus via the discharge rollers 310. Through the above series of sequences, the controller 205 controls the printing apparatus 100 so as to execute double-sided printing.

Furthermore, the printing apparatus 100 is provided with feeding units that accommodate the sheets required for print processing. Feeding units include paper feed cassettes 317 and 318 (for example, each of these can accommodate 500 sheets), a paper feed deck 319 (for example, this can accommodate 5,000 sheets), and a manual feed tray 320. In the paper feed cassettes 317 and 318 and the paper feed deck 319, various types of sheets of different sizes and quality can be loaded separately into each of these feeding units. Furthermore, various types of sheets including special sheets such as OHP sheets or the like can be loaded into the manual feed tray 320. Feeding rollers are arranged for each of the paper feed cassettes 317 and 318, the paper feed deck 319, and the manual feed tray 320, and the sheets are continuously fed sheet by sheet by the feeding rollers.

Next, description is given regarding the sheet processing apparatus 200 shown in FIG. 3.

In the sheet processing apparatus 200 in the print system according to the present exemplary embodiment, any number of any types of apparatus can be linked as long as sheets can be transported via a sheet transport path from an upstream apparatus to a downstream apparatus. For example, as shown in FIG. 3, a large-volume stacker 200-3*a*, an inserter 200-3*d*, a glue binding apparatus 200-3*b*, and a saddle stitching apparatus 200-3*c* can linked in order of proximity to the printing apparatus 100 and each of these can be used selectively in the print system. Furthermore, sheet discharge units are provided for each of the sheet processing apparatuses 200 and the user can remove sheets that have undergone sheet processing from the sheet discharge unit of the respective sheet processing apparatus.

From the candidates of executable types of sheet processing by the sheet processing apparatuses 200 connected to the printing apparatus 100, the controller 205 receives an execution request for a type of sheet processing desired by the user and a print execution request via the console unit 204. Then, in response to receiving via the console unit 204 from the user the print execution request for a job to be processed, the controller 205 executes the print processing required for that job using the print unit 203. Then, by transporting the sheet that has undergone this print processing via a sheet transport path to the sheet processing apparatus that is capable of executing the sheet processing desired by the user, the controller 205 can execute sheet processing (post-processing) in that sheet processing apparatus.

For example, in a case where this print system 1000 is configured as the system shown in FIG. 3, suppose that a job to be processed for which a print execution request has been received from the user is a job giving instruction that a large volume stacking process is to be carried out by the large-volume stacker 200-3*a*. This job is referred to as a “stacker job”. In a case where the stacker job is to be processed, the controller 205 causes the sheets of this job that have been printed on by the printing apparatus 100 to pass a point A in FIG. 3, then to be transported into the large-volume stacker 200-3*a*. After this, the controller 205 executes a stacking process for this job in the large-volume stacker 200-3*a*. Then, the controller 205 causes the printed materials of this job that have undergone a stacking process in the large-volume stacker 200-3*a* to be held at a discharge section X inside the large-volume stacker 200-3*a* without being transported to other apparatuses (later stage apparatuses for example).

In this way, the user can directly remove from the discharge section X the printed materials of the stacker job being held at the discharge section X in the large-volume stacker 200-3*a*. This makes unnecessary a series of apparatus actions and user operations in which the sheets are transported to a most downstream discharge section Z in the sheet transport direction in FIG. 3 and for the printed materials of the stacker job to be removed from the discharge section Z.

Furthermore, with the system configuration shown in FIG. 3, suppose that the job to be processed for which a print execution request has been received from the user is a job giving instruction that sheet processing by the glue binding apparatus 200-3*b* (for example, a glue binding process of either of a case binding process or a pad binding process) is to be carried out. This job is referred to as a “glue binding job”. In a case where this glue binding job is to be processed, the controller 205 causes the sheets that have been printed on by the printing apparatus 100 to be transported into the glue binding apparatus 200-3*b* via the point A, a point A-a, and a point B in FIG. 3. After this, the controller 205 executes a glue binding process for this job in the glue binding apparatus 200-3*b*. Then, the controller 205 causes the printed materials of this job that have undergone the glue binding process in the glue binding apparatus 200-3*b* to be held as they are at a discharge section Y inside the glue binding apparatus 200-3*b* without being transported to other apparatuses (later stage apparatuses for example).

Further still, for example, suppose that a job to be processed for which a print execution request has been received from the user is a job giving instruction for sheet processing to be carried out by the saddle stitching apparatus 200-3*c*. Sheet processing by the saddle stitching apparatus 200-3*c* includes processing such as saddle stitching, punching, trimming, shift discharge processing, and folding processes for example. Here, this job is referred to as a “saddle stitching job”. In a case where this saddle stitching job is to be processed, the controller 205 causes the sheets of this job that have been printed on by the printing apparatus 100 to be transported to the saddle stitching apparatus 200-3*c* by passing the point A, point A-a, point B, and a point C. After this, the controller 205 executes sheet processing for this job in the saddle stitching apparatus 200-3*c*. Then, the controller 205 causes the printed materials of the saddle stitching job that have undergone sheet processing by the saddle stitching apparatus 200-3*c* to be held at the discharge section Z of the saddle stitching apparatus 200-3*c*. It should be noted that the discharge section Z includes multiple discharge section candidates. This enables the saddle stitching apparatus 200-3*c* to execute multiple types of sheet processing and is used for designating the discharge sections for each type of sheet processing.

As described above with reference to FIGS. 1 to 3, the print system according to the present exemplary embodiment enables multiple sheet processing apparatuses to be connected to the printing apparatus 100. And these multiple sheet processing apparatuses can be connected to the printing apparatus 100 in arbitrary combinations. Furthermore, the connection sequence of these multiple sheet processing apparatuses can be freely varied as long as the sheet transport paths between the apparatuses are linked. Furthermore, there are multiple types of candidate sheet processing apparatuses that can be connected to the printing apparatus 100.

Figure 4:
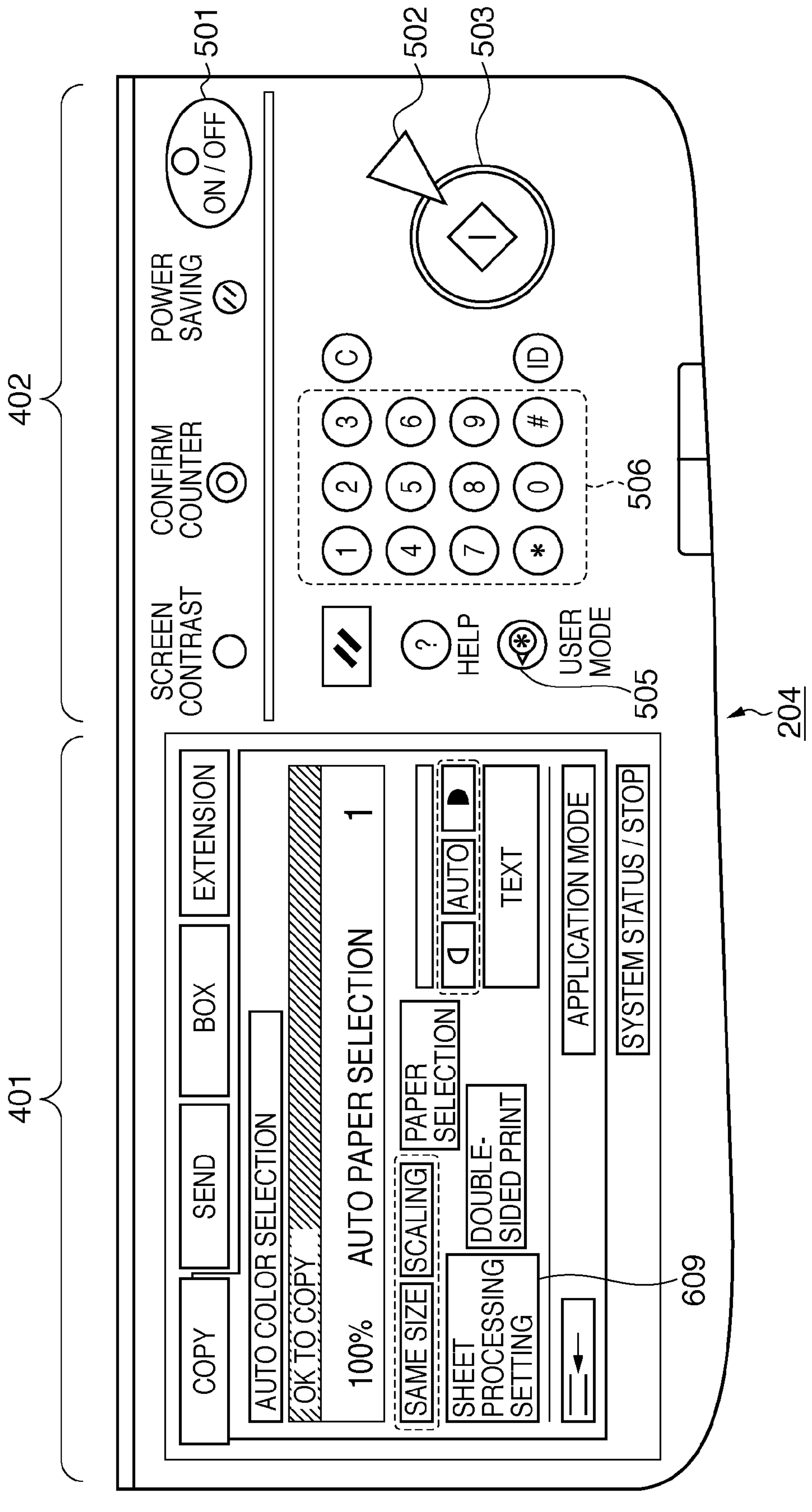
FIG. 4 depicts an external view illustrating a console unit of the printing apparatus according to the present exemplary embodiment.

Next, description is given using FIG. 4 of a configuration of the console unit 204.

FIG. 4 depicts an external view illustrating the console unit 204 of the printing apparatus 100 according to the present exemplary embodiment.

The console unit 204 is provided with the touch panel section 401 and the key-input section 402. The touch panel section 401 has a liquid crystal display unit and a transparent electrode attached thereon, and displays various setting screens for receiving instructions from the user. The touch panel section 401 is provided with both a function for displaying various screens, and an instruction input function for receiving instructions from the user. The key-input section 402 is provided with an on/off key 501, a stop key 502, a start key 503, a user mode setting button 505, and a numeric keypad 506. The start key 503 is used when commencing execution of a copying job or a transmission job at the printing apparatus 100. The numeric keypad 506 is used when carrying out settings of numerical input such as a number of prints. The controller 205 controls the print system so that various processes are carried out based on user instructions received via the various screens displayed on the touch panel section 401 and user instructions received via the key-input section 402.

Figure 5:
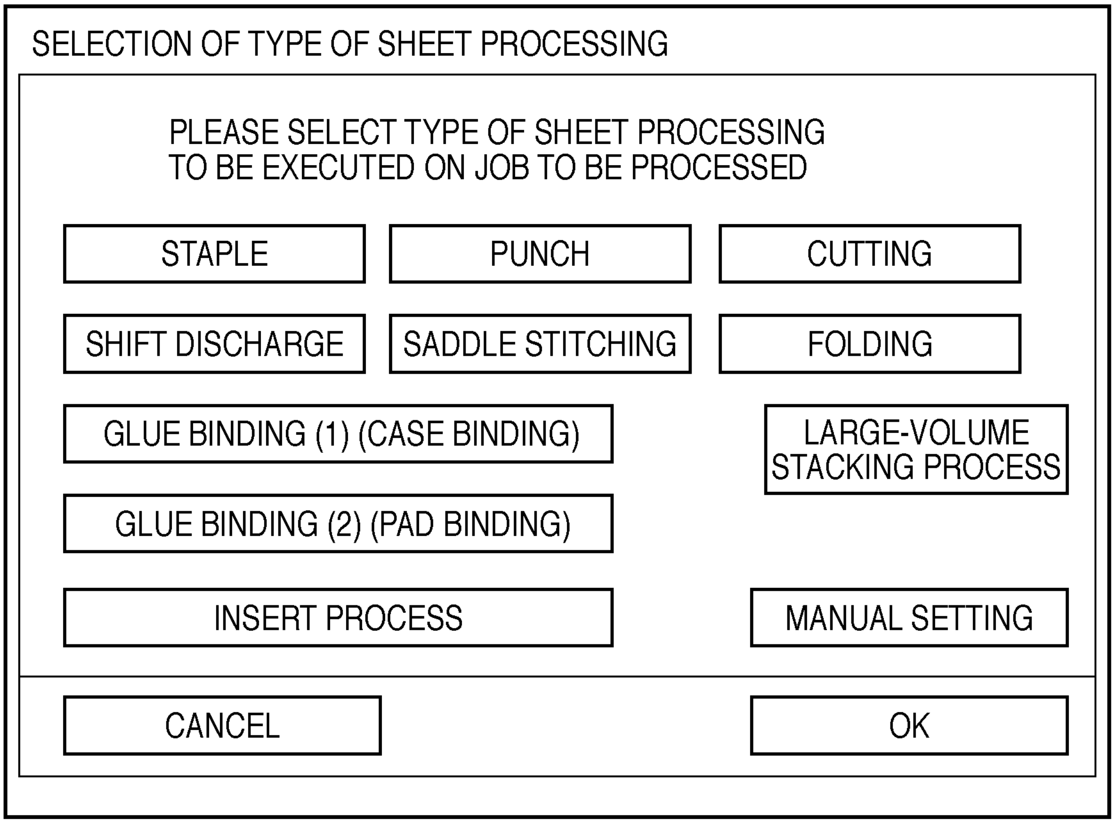
FIG. 5 is a diagram describing a display example of a settings screen for enabling selection by a user of types of sheet processing to be executed on sheets that have been printed on by the printing apparatus according to the exemplary embodiment of the present invention.

FIG. 5 is a diagram describing a display example of a setting screen for enabling selection by the user of types of sheet processing to be executed on the sheets that have been printed on by the printing apparatus according to the exemplary embodiment of the present invention.

When a sheet processing setting key 609, which is displayed in FIG. 4 on the screen displayed on the touch panel section 401, is pushed by the user, the controller 205 displays the screen shown in FIG. 5 on the touch panel section 401. The screen shown in FIG. 5 is a setting screen configured so that the user can select the type of sheet processing executable using the sheet processing apparatuses 200 included in the print system. The controller 205 receives from the user via the screen shown in FIG. 5 the settings of the sheet processing to be executed for the job to be processed, and sheet processing is executed in the sheet processing apparatus 200 according to these settings.

It should be noted that in a case where the sheet processing apparatuses 200 are connected to the printing apparatus 100, a configuration may be used that enables an operator to register information for specifying how many and what type of sheet processing apparatuses are to be connected in which connection sequence.

For example, consider a case where the print system 1000 is configured as the system shown in FIG. 3. At this time, registration information is set indicating that the four sheet processing apparatuses of the large-volume stacker, the inserter, the glue binding apparatus, and the saddle stitching apparatus are to be connected to the printing apparatus 100 in order from the large-volume stacker. The controller 205 holds information relating to the sheet processing apparatuses 200 set by the operator in the RAM 208 as system configuration information, and reads the information out and references it as required. In this way, the controller 205 confirms how many and what type of sheet processing apparatuses are to be connected in which sequence to the printing apparatus 100.

Consider that the user performs a setting in which a saddle stitching apparatus not having a straight path is connected among multiple sheet processing apparatuses. In this case, the controller 205 causes an error display to be displayed on the touch panel section 401 for giving notification to the effect that this setting is invalid. Furthermore, the controller 205 may also cause guidance information to be displayed notifying the operator to connect the saddle stitching apparatus at the endmost of the sequence so that such as setting is not carried out.

In the present exemplary embodiment, the console unit 204 installed in the printing apparatus 100 is shown as one example of a user interface unit applied in the print system 1000, but units other than the console unit 204 may be used. For example, configurations are also possible in which processing is executed in the print system 1000 based on instructions from a user interface unit installed in an external device such as the PC 103 or the PC 104 or the like. In a case where remote operation of the print system 1000 is performed in this manner from an external device, the setting screens relating to the print system 1000 are displayed on a display unit of that device (the PC 103 or the PC 104 or the like).

Description is given using the PC 104 as an example. When a CPU provided in the PC 104 receives a print request from a user, a setting screen is displayed on the display of the PC and settings of print processing conditions are received from the operator of the PC 104 via this screen. And when a print request is received from the operator, the CPU provided in the PC 104 associates the print processing conditions received via the screen of the PC and the image data to be printed. Then, control is performed such that this is sent as a single job to the print system 1000 by way of the network 101.

On the other hand, if the print execution request for this job is received at the print system 1000 via the external I/F 202, the controller 205 controls the print system 1000 so that the job from the PC 104 is processed based on the print processing conditions from the PC 104. In this way, various units can be provided as the user interface of the print system 1000.

Next, description is given hereinafter relating to various types of control executed for the print system 1000 by the controller 205, which corresponds to one example of a controller in the present exemplary embodiment.

The print system 1000 is equipped with the printing apparatus 100 having the print unit 203 capable of executing print processing of job data stored in the HDD 209, which is capable of storing the data of multiple jobs. Furthermore, the printing apparatus 100 and multiple sheet processing apparatuses 200 can be connected in the print system 1000. Furthermore, each of the multiple sheet processing apparatuses 200 that can be connected to the printing apparatus 100 is capable of executing sheet processing (also referred to as finishing or post processing) on the sheets (also referred to as printed materials or print media) of jobs that have undergone printing by the print unit 203. Furthermore, in these sheet processing apparatuses 200, the operator can remove the printed materials that have undergone sheet processing in any of the individual apparatuses. Furthermore, sheets that have been set in the paper feed deck of the inserter 200-3*d*, which is one of these sheet processing apparatuses 200, can be selectively supplied to the multiple sheet processing apparatuses 200.

Furthermore, in the print system 1000 according to the present exemplary embodiment, sheets that have undergone printing by the print unit 203 can be selectively supplied from the print unit 203 to the multiple sheet processing apparatuses 200.

Furthermore, the print system 1000 has a function by which a job is processed using only the sheet processing apparatus 200 without using the printing apparatus 100. The controller 205 controls the print system 1000 so that processing using only the sheet processing apparatus 200 (an offline job) and processing using also the printing apparatus 100 (an inline job) can be selectively executed based on operator instructions from the user interface unit (UI unit) for each job to be processed. Furthermore, the controller 205 can also control the print system 1000 so that these two types of processing can be combined and executed depending on the situation.

Also, the print system 1000 according to the present exemplary embodiment is organized as a setup that fully provides flexibility and/or usability so that post-processing by the post-processing apparatuses connected to the printing apparatus can be implemented without accompanying printing by the printing apparatus thereof. For example, in regard to this setup, the print system 1000 according to the present exemplary embodiment is provided with an execution request acceptance unit for receiving an execution request of a specific job (offline job) in which post-processing is to be carried out by the post-processing apparatus connected to the printing apparatus without carrying out printing by the printing apparatus.

It should be noted that in the present exemplary embodiment a configuration is shown as an example in which the printing apparatus corresponds to the print unit 203 and/or the printing apparatus 100, and the sheet processing apparatus 200 connected to the printing apparatus functions as a post-processing apparatus. And in the present exemplary embodiment, a job is shown as an example of the specific job involving only sheet processing (hereinafter post-processing) by the sheet processing apparatus 200 without requiring printing by the print unit 203 as described above. For example, a job in which post-processing is to be executed by the sheet processing apparatus 200 without accompanying printing by the printing apparatus 100 corresponds to this specific job. It should be noted that in the present exemplary embodiment, post-processes that are allowed to be executed as the specific job are as follows:

(1) Stapling process
(2) Punching process
(3) Trimming process
(4) Saddle stitching process
(5) Folding process
(6) Case binding process
(7) Pad binding process
(8) Insertion process In the present exemplary embodiment, the post-processes of (1) to (6) can be selectively executed using the saddle stitching apparatus 200-3*c* of the sheet processing apparatus 200. Furthermore, the post-processes of (6) and (7) can be selectively executed using the glue binding apparatus 200-3*b* of the sheet processing apparatus 200. Furthermore, the post-processes of (8) can be executed using the inserter 200-3*d* of the sheet processing apparatus 200 shown in FIG. 3.

Figure 8:
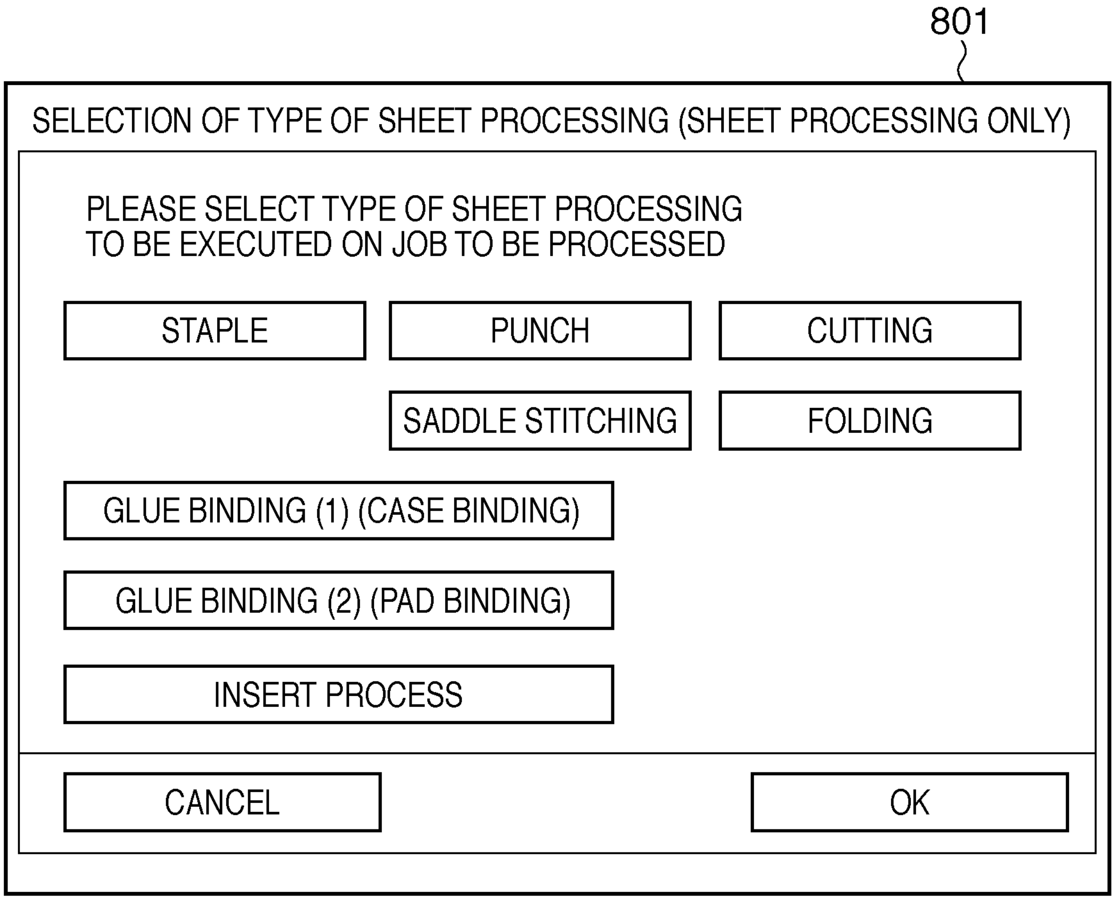
FIG. 8 is a diagram illustrating one example of a sheet processing selection UI for selecting a type of sheet processing according to the present exemplary embodiment.

Furthermore, in the present exemplary embodiment, control is performed by the controller 205 so that multiple selection candidates are displayed on the user interface as the post-processes allowed to be executed without accompanying printing by the printing apparatus 100. A configuration is provided in which sheet processing can be executed as shown in FIG. 8, which is described later, as a specific example of sheet processing (post-processing).

In regard to the above-mentioned points, these are merely examples for illustration and any type of sheet processing may be employed as sheet processing that is executable without accompanying printing by the printing apparatus 100. Furthermore, a configuration is not always required to support selective execution of the multiple types of sheet processing as in the present exemplary embodiment, and there is no limitation to this. For example, the present invention also includes a configuration in which only one type of sheet processing can be executed without carrying out printing.

Furthermore, in the present exemplary embodiment, various user interfaces provided by the print system 1000, which are configured to be capable of interactively responding to operator operations, function as the above-mentioned execution request acceptance unit. For example, the console unit 204 and/or software keys and hard keys installed on the console unit 204, and/or the various user interface screens shown in the diagrams are single examples of the execution request acceptance unit. It should be noted that these are examples shown for illustration and there is no limitation to these.

For example, a configuration is possible such that execution requests of the aforementioned specific jobs are received also from external devices other than the print system 1000. In this case, the user interfaces installed in external data sources, such as the network scanner 102, the PC 103 and the PC 104 or the like, function as the execution request acceptance unit. Furthermore, in this case, units such as the external I/F 202 that are necessary for the print system 1000 to receive specific jobs from external sources also function as the execution request acceptance unit. In this way, various modified applications are possible with the present exemplary embodiment, and any form of system having at least a configuration corresponding to the configuration shown as an example below as in the print system 1000 according to the present exemplary embodiment is also applicable. For example, suppose that the controller 205 receives an execution request for the aforementioned specific job via the aforementioned user interface. In this case, in response to the execution request, the controller 205 performs control so that sheet processing for the printed materials (first printed materials), which are prepared in advance for the specific job, is executed by the sheet processing apparatus 200 without printing being carried out by the printing apparatus 100.

In a case where the print system 1000 has received an execution request for the aforementioned specific job in this manner, the sheet processing for the first printed materials, which have been prepared in advance for that job, can be executed by the sheet processing apparatus without carrying out printing by the printing apparatus. In the present exemplary embodiment, a configuration is shown in which the controller 205 functions as a control unit to achieve this function.

It should be noted that in the present exemplary embodiment, a supply unit, which is configured to enable supply of multiple print media (printed materials) that have undergone printing in advance as the first printed materials, is installed in the sheet processing apparatus 200 itself. An inserter or a paper feed deck or the like is provided for each of the large-volume stacker, the saddle stitching apparatus, and the large-volume inserter, which are shown as examples of the sheet processing apparatuses 200. In the present exemplary embodiment, these units not only fulfill functions described earlier, but also function as supply units. And the first printed materials (sheets) necessary for the aforementioned specific job are set in the supply unit by the operator.

And in the present exemplary embodiment, in a case where the execution request of the specific job is given from the operator, the controller 205 performs control so that the first printed materials (sheets) are supplied from the supply unit to the sheet processing unit inside the sheet processing apparatus 200 without traveling via the aforementioned printing apparatus. After this, the controller 205 executes sheet processing on the first printed materials (sheets) using that sheet processing apparatus. With this method, the controller 205 can execute the sheet processing designated by the user for that job using the sheet processing apparatus 200 without accompanying printing by the printing apparatus 100.

It should be noted that a configuration is possible in which when the aforementioned specific job is to be executed, the aforementioned first printed materials (sheets) to be used for that job are supplied from a paper feed cassette as a supply unit installed in the printing apparatus 100. In this case, control is performed by the controller 205 such that the first printed materials are guided into the sheet processing apparatus 200 via a transport path inside the printing apparatus 100, but printing is not carried out on the first printed materials by the printing apparatus 100 at this time. And control is performed by the controller 205 so that once the printed materials have been guided to the sheet processing apparatus 200, the sheet processing designated by the user is executed on these printed materials. A configuration such as this is also possible.

First Exemplary Embodiment

Hereinafter, description is given regarding a first exemplary embodiment of the present invention. In the print system 1000 according to the first exemplary embodiment, description is given regarding a case where inline job settings and offline job settings, which are set by the user at the console unit 204, are received by the controller 205 and the print processing and the sheet processing thereof are executed in accordance with those settings.

Figure 6:
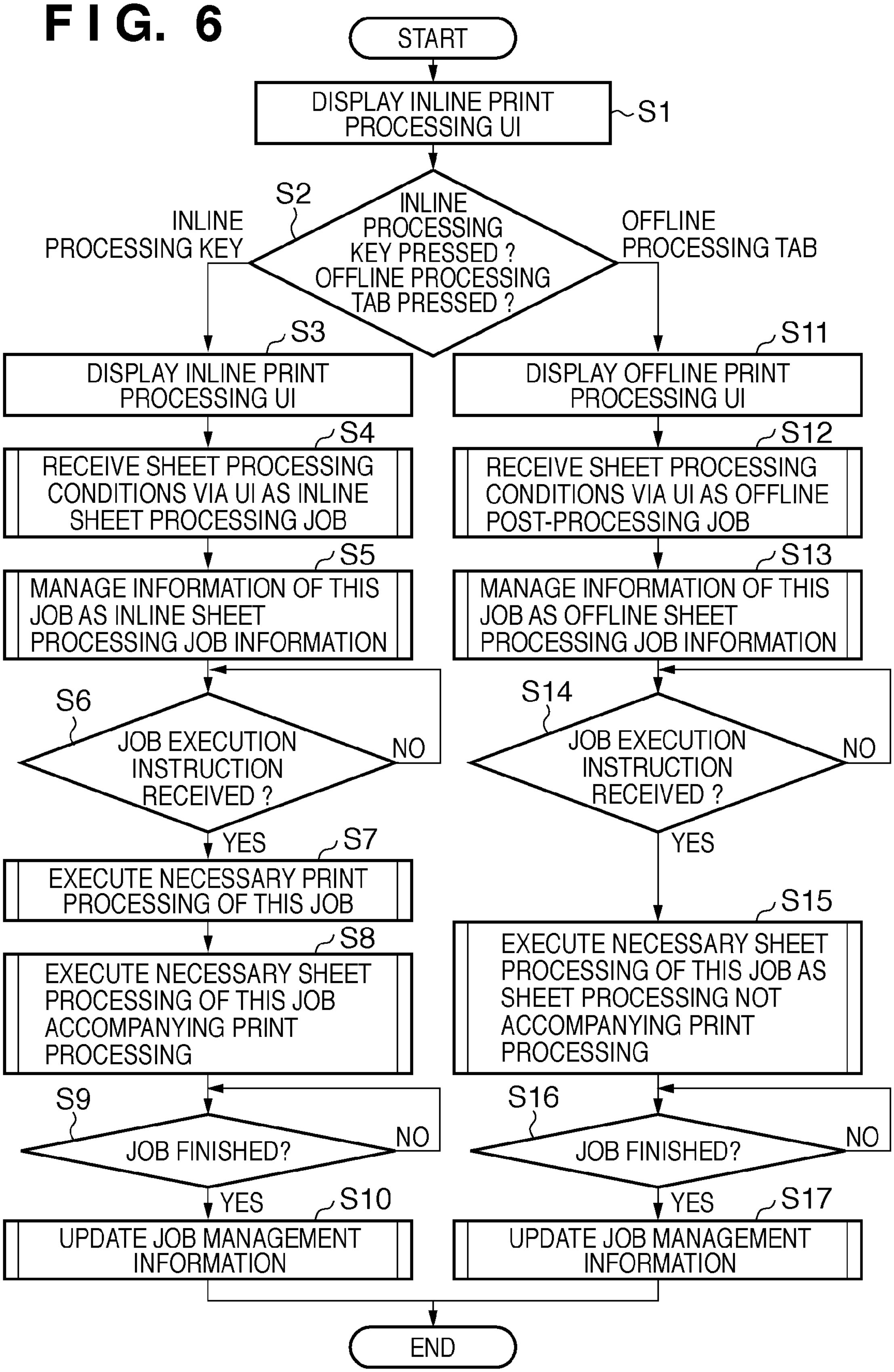
FIG. 6 is a flowchart describing processing in the print system according to a first exemplary embodiment of the present invention.

FIG. 6 is a flowchart describing processing in the print system according to the first exemplary embodiment. A program for executing this processing is stored in the ROM 207 and executed under the control of a CPU of the controller 205.

First, in step S1, the controller 205 of the printing apparatus 100 displays an in-line print process UI on the touch panel section 401 of the console unit 204, then the procedure proceeds to step S2.

Figure 7:
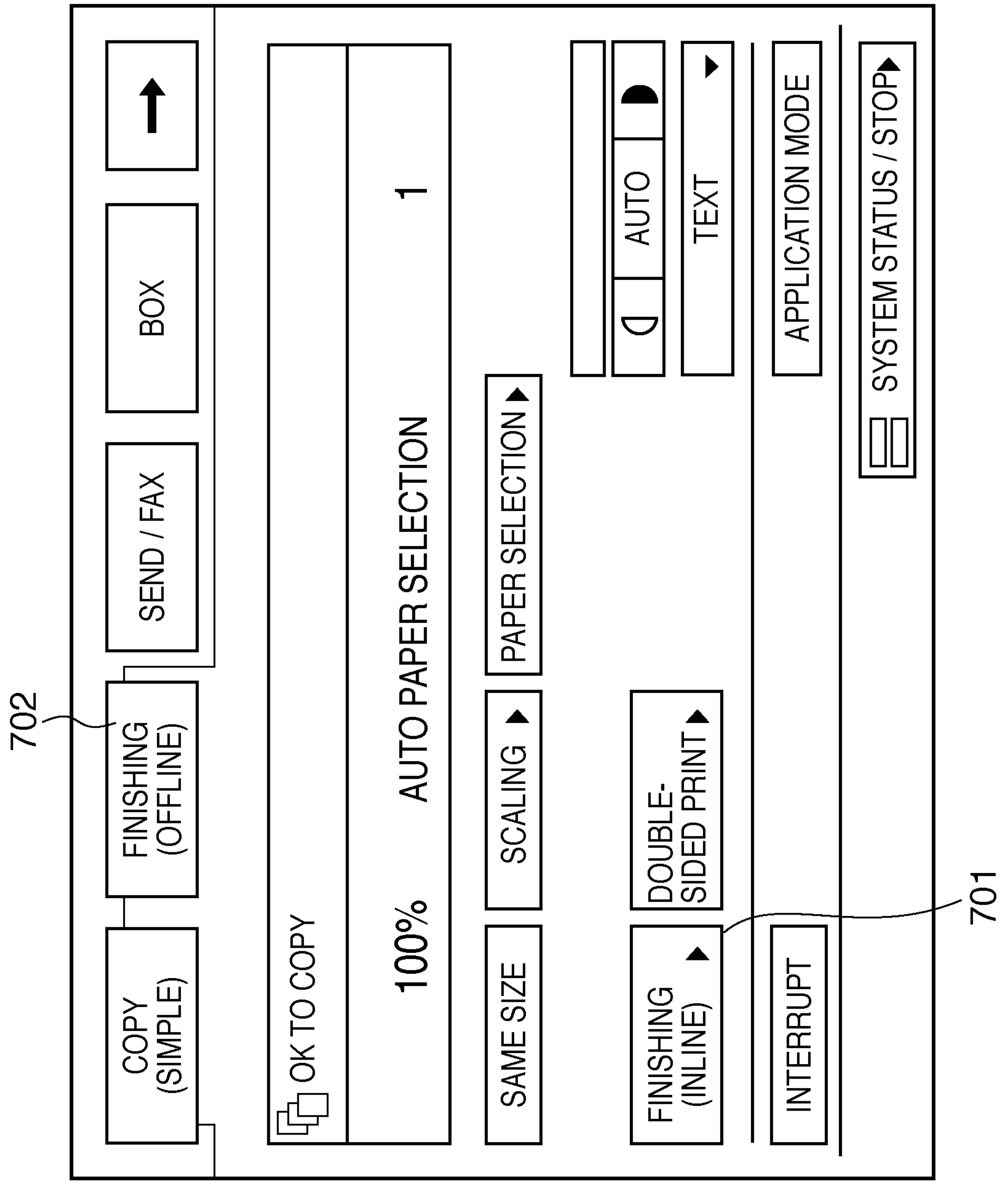
FIG. 7 is a diagram illustrating a display example of an in-line print process UI according to the present exemplary embodiment.

FIG. 7 is a diagram illustrating a display example of the in-line print process UI.

In addition to buttons for selecting copy, send/fax, and box functions, this UI screen displays a button 702 for designating an offline finishing process. Furthermore, numeral 701 indicates a button for designating an inline finishing process.

In step S2, the controller 205 determines whether the inline finishing key 701 is pressed or whether the offline finishing button 702 is pressed on the in-line print process UI shown in FIG. 7, which is displayed on the touch panel section 401 of the console unit 204. Here, if it is determined in step S2 that the inline finishing key 701 has been pressed, the procedure proceeds to step S3 and sheet processing settings from the user for the inline job are received. On the other hand, if it is determined in step S2 that the offline finishing button 702 has been pressed, the procedure proceeds to step S11 and sheet processing settings from the user for the offline job are received.

Hereinafter, description is given regarding settings and processing of an inline job. This inline job is a job control process in which processes from printing of the sheet through to sheet processing are carried out in an integrated manner.

First, in step S3, the controller 205 displays a sheet processing type selection UI 801 shown in FIG. 8 on the touch panel section 401 of the console unit 204. Here, the controller 205 displays on the sheet processing type selection UI 801 in a list of sheet processing that can be set for the inline job. Next, the procedure proceeds to step S4 and the controller 205 determines the sheet processing settings of the inline job designated by the user on the sheet processing type selection UI 801. At this time, if the user presses a button that specifies a sheet processing item of FIG. 8, the controller 205 displays a setting UI screen (not shown in diagram) corresponding to the specified sheet processing, and more detailed settings are received.

FIG. 8 is a diagram illustrating one example of a sheet processing type selection UI according to the present exemplary embodiment.

Here, "staple," "punch," "cutting," "saddle stitching," "folding," "case binding," "pad binding," and "insert process," can be set as sheet processes. It should be noted that it is also possible here to designate multiple sheet processes.

Next, the procedure proceeds from step S4 to step S5 and the controller 205 manages the settings of the inline job that have been set using the sheet processing type selection UI 801 by storing these settings in the RAM 208 or the HDD 209. Next, the procedure proceeds to step S6, and the controller 205 determines whether or not the start key 503 (FIG. 4) on the touch panel section 401 has been pressed to instruct job execution. When the start key 503 is pressed and job execution is instructed, the procedure proceeds to step S7, and the controller 205 executes the print processing of the print job based on the inline job settings that have been managed in step S5. Next, the procedure proceeds to step S8, and the controller 205 executes the sheet processing on the sheets printed in step S7 based on the inline job settings that have been managed in step S5. Then, in step S9, it is determined whether or not the inline job has been finished, and the procedure proceeds to step S10 if the job has been completed. On the other hand, in a case where the job is not completed, the procedure waits in step S9 for the job to be completed, then the procedure proceeds to step S10. In step S10, the controller 205 updates the inline job settings managed in step S5 in accordance with the completion of the job, and this process finishes.

Next, a description is given regarding settings and processing of an offline job. This offline job is a job in which sheet processing is carried out on sheets that have already been printed, and is a job that does not involve print processing.

Figure 9:
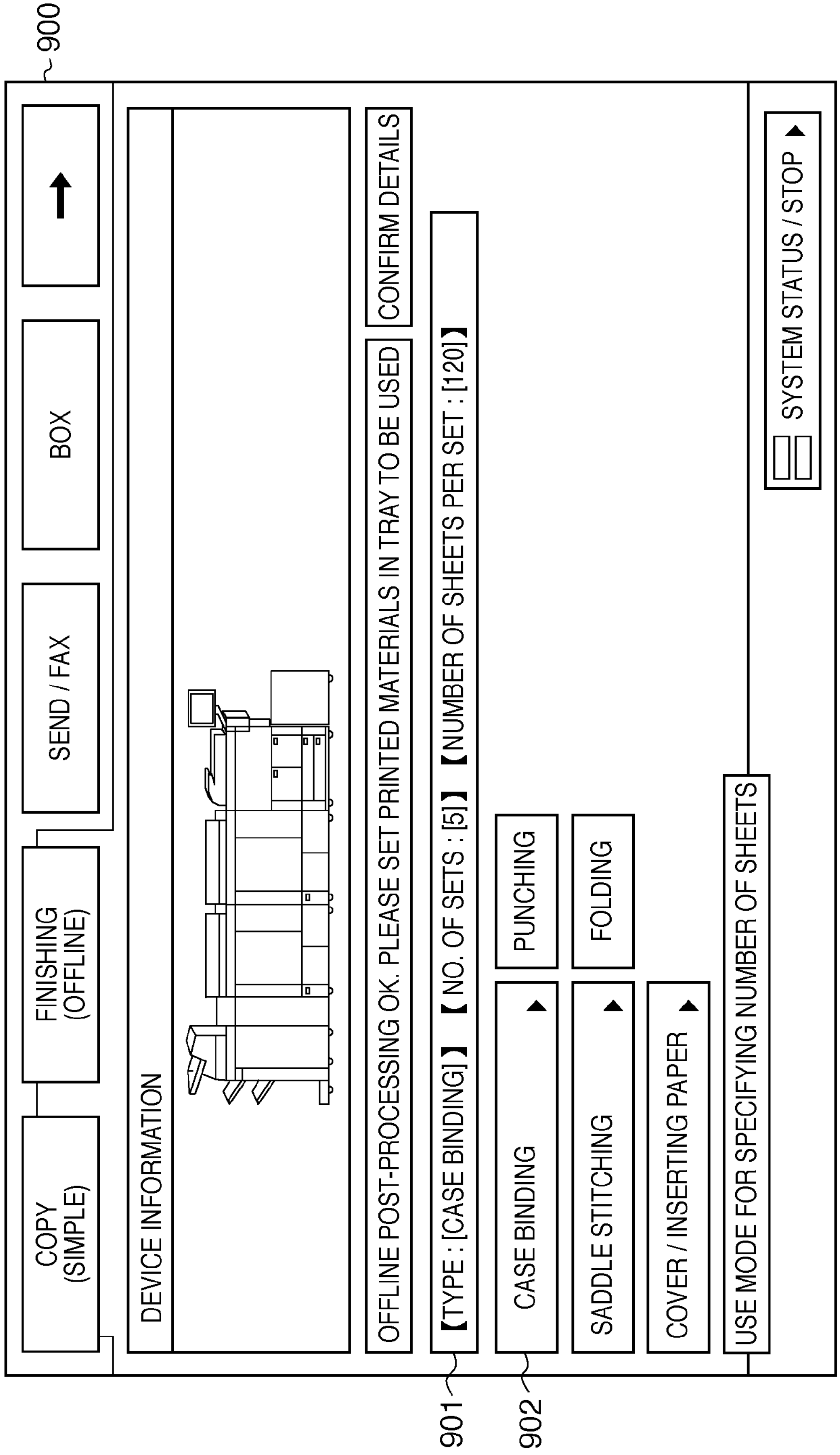
FIG. 9 is a diagram illustrating a display example of an offline job setting UI screen according to the present exemplary embodiment.

When it is determined in step S2 that the offline finishing button 702 (FIG. 7) has been pressed, the procedure proceeds to step S11, and the controller 205 displays on the touch panel section 401 of the console unit 204 an offline job setting UI 900 shown in FIG. 9. Here, the controller 205 displays on the offline job setting UI 900 in a list of sheet processes that can be set for the offline job.

FIG. 9 is a diagram illustrating a display example of the offline job setting UI according to the present exemplary embodiment.

Here, post-processing conditions (detailed settings of sheet processing) by which the offline job is to be executed are displayed.

Next, the procedure proceeds to step S12 and the controller 205 receives offline job sheet processing settings that have been selected on the offline job setting UI 900 on the touch panel section 401. The controller 205 displays setting UIs for the sheet processes that have been selected by detecting the pressing of each button of the sheet processing settings, which enables more detailed settings to be received. Sheet processes that have been set in this manner are displayed as shown by numeral 901 in FIG. 9 for example.

In step S12, a description is given of a case where for example the user sets case binding at the offline job setting UI 900 in FIG. 9.

Figure 10:
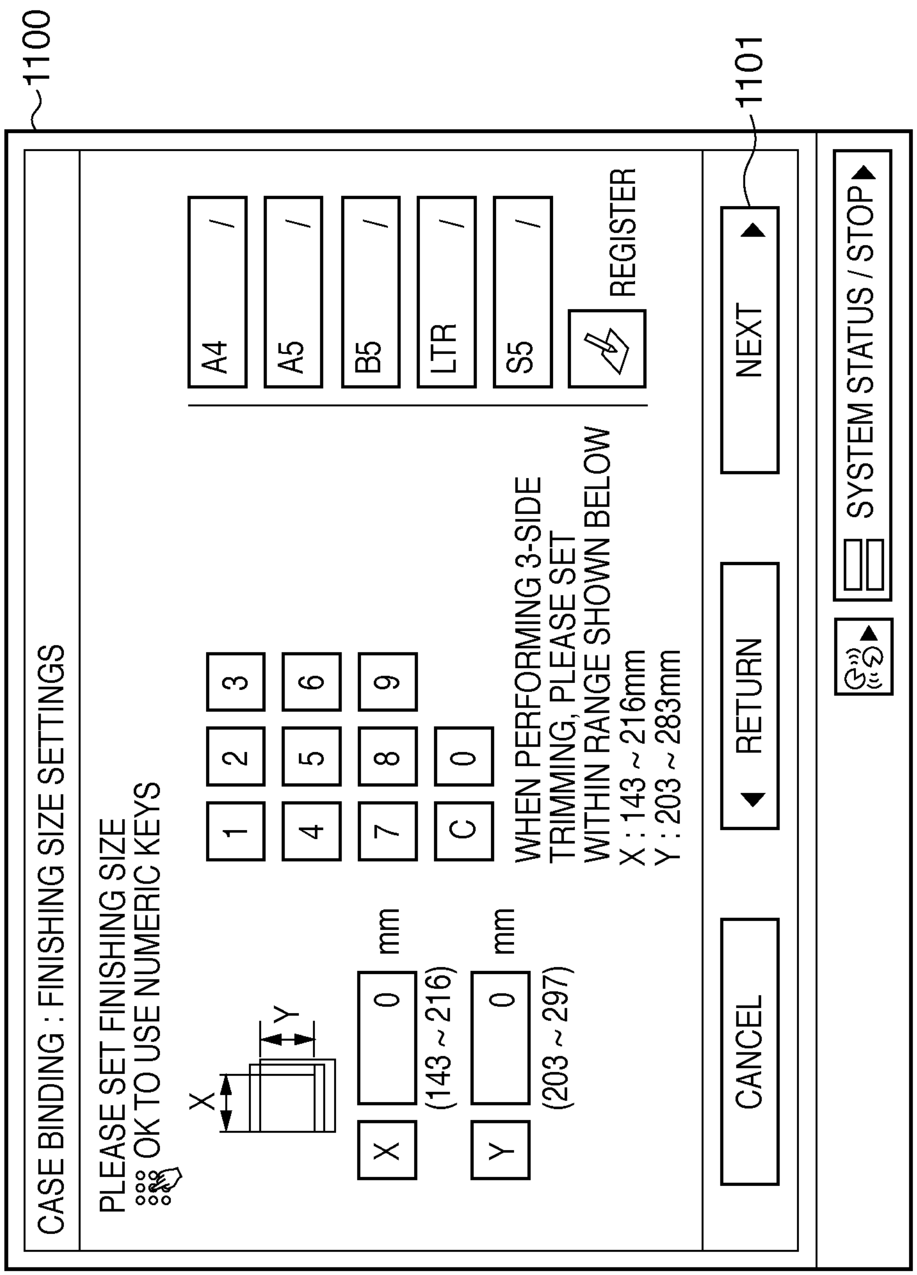
FIG. 10 is a diagram illustrating a display example of a case binding finishing size setting UI screen according to the present exemplary embodiment.

If it is determined that a case binding button 902 has been pressed on the offline job setting UI 900, the controller 205 displays a case binding finishing size setting UI 1100 as shown in FIG. 10. In this way the user can use the finishing size setting UI 1100 to designate a finishing size of the resultant product that is to undergo binding.

FIG. 10 is a diagram illustrating a display example of a screen of a case binding finishing size setting UI according to the first exemplary embodiment.

Figure 11:
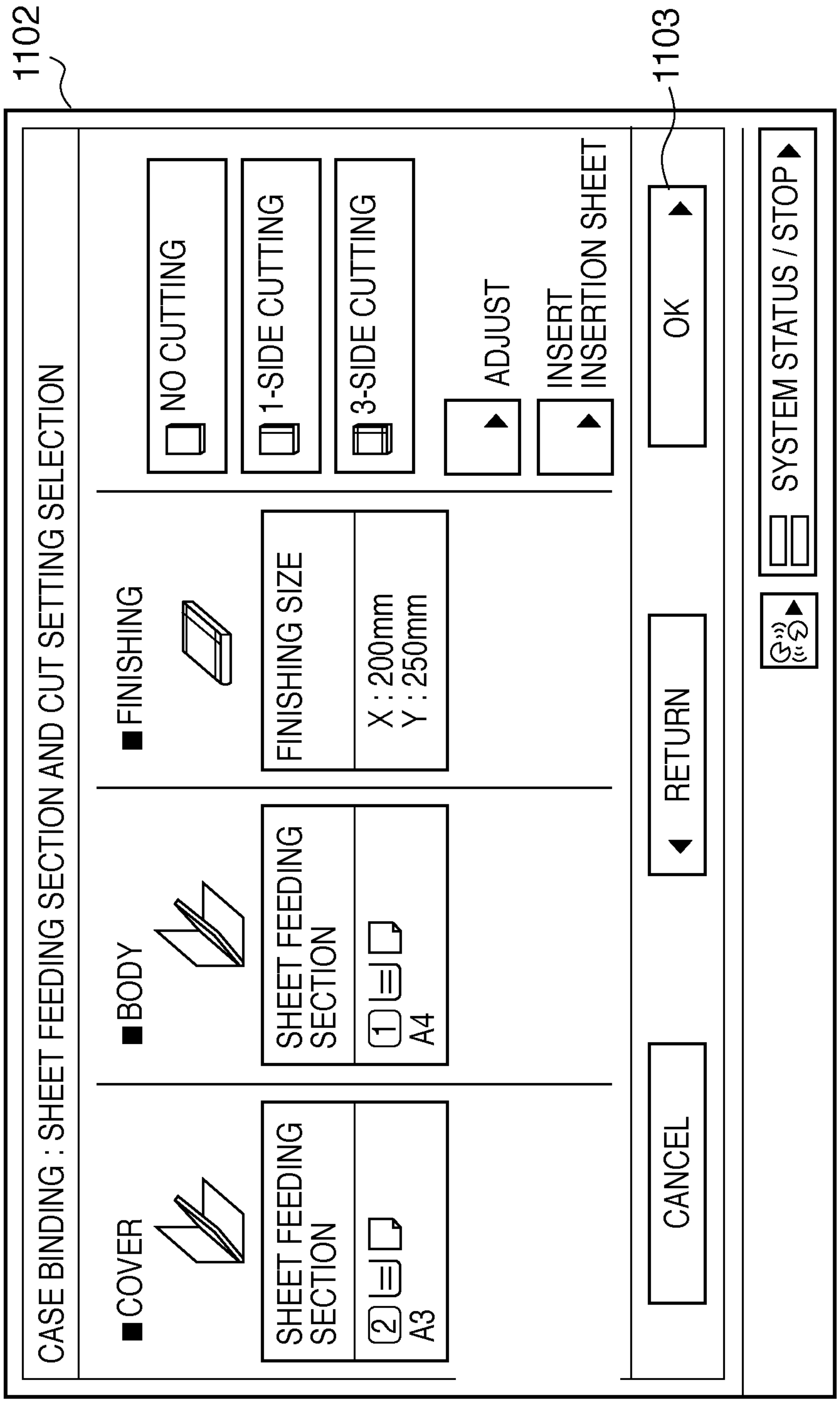
FIG. 11 is a diagram illustrating a display example of a screen of a case binding paper feeding section and cut setting selection UI according to the present exemplary embodiment.

If a "next" button 1101 is pressed on the case binding finishing size setting UI 1100 in FIG. 10, a case binding paper feeding section and cut setting selection UI shown in FIG. 11 is displayed.

FIG. 11 is a diagram illustrating a display example of a screen of a case binding sheet feeding section and cut setting selection UI according to the present exemplary embodiment.

By using a sheet feeding section and cut setting selection UI 1102, the user can select the sheet feeding section of sheets to be undergone binding, and edge cutting or edge cutting and head/tail orientation of cutting. When it is determined that a button 1103 on the sheet feeding section and cut setting selection UI 1102 has been pressed, the controller 205 displays the offline job setting UI 900 of FIG. 9. At this time, the controller 205 receives case binding print settings at the case binding finishing size setting UI 1100 or the sheet feeding section and cut setting selection UI 1102.

Next, the procedure proceeds to step S13 and the controller 205 manages the settings of the offline job that have been set using the offline job setting UI 900 by storing these settings in the RAM 208 or the HDD 209, or both of these. Furthermore, detailed settings of the sheet processes that have been set when the sheet processing buttons have been pressed on the offline job setting UI 900 are also stored in the RAM 208 or the HDD 209, or both of these. Next, the procedure proceeds to step S14, and the controller 205 determines whether or not the start key 503 on the touch panel section 401 has been pressed. When the start key 503 has been pressed, the procedure proceeds to step S15, but when the start key 503 has not been pressed, the controller 205 stands by in step S14. In step S15, the controller 205 executes (post-processing execution) sheet processing that does not accompany a print job based on the offline job settings that have been managed in step S13. Next, the procedure proceeds to step S16, and the controller 205 determines whether or not the offline job has been completed. If the job has been completed, the procedure proceeds to step S17, but if the job is not completed, the procedure stands by in step S16 waiting for completion of the job. In step S17, the controller 205 updates the offline job settings managed in step S13 according to the completion of the job, and this process finishes.

Next, a description is given regarding processing when an interruption has occurred in an inline job or an offline job, which is a feature of the present exemplary embodiment.

Figure 12:
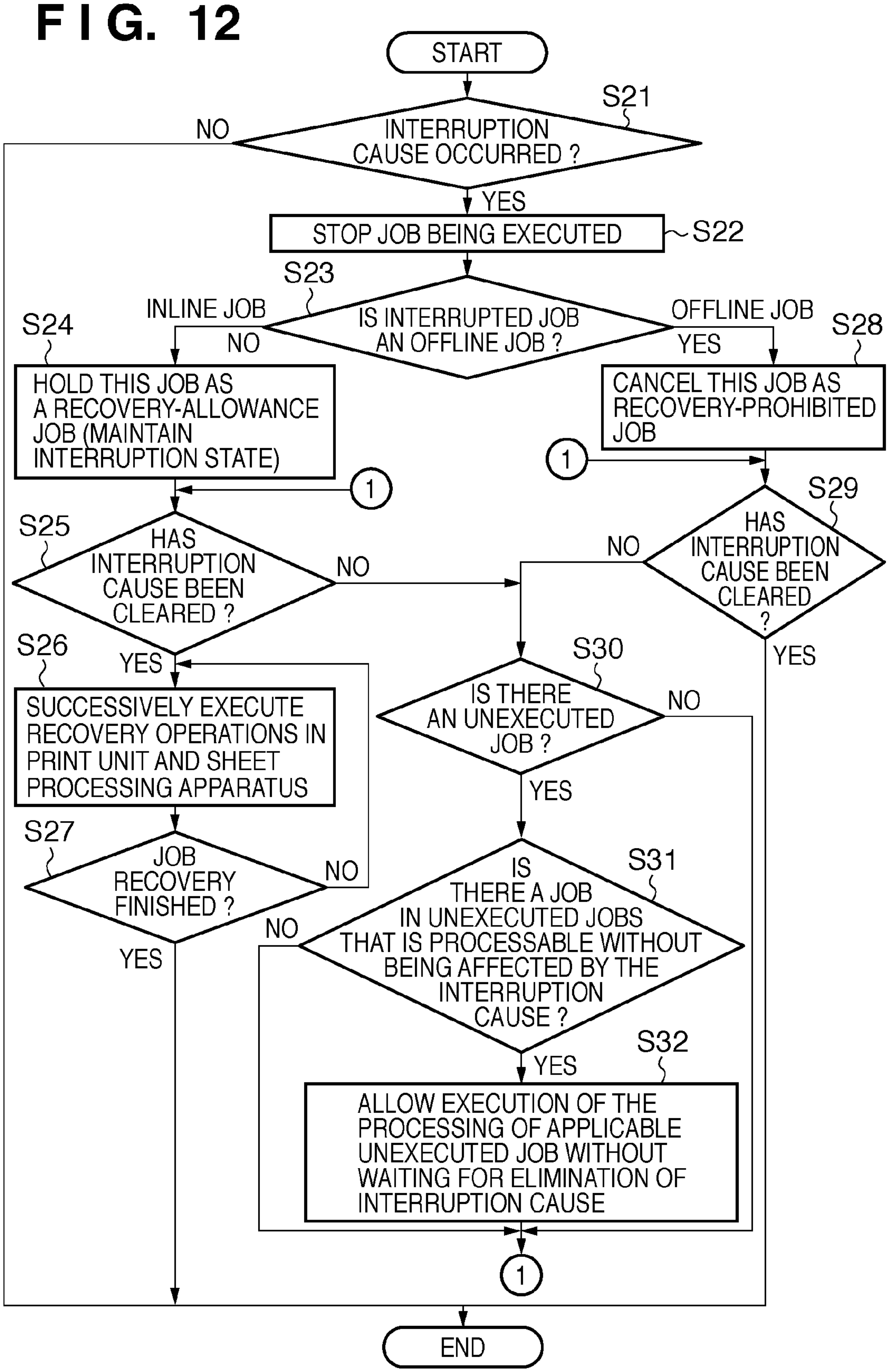
FIG. 12 is a flowchart describing processing in a case where a job interruption has occurred in the print system according to the first exemplary embodiment.

FIG. 12 is a flowchart describing processing in a case where a job interruption has occurred in the print system according to the first exemplary embodiment. It should be noted that a program for executing this process is stored in the ROM 207 and executed under the control of a CPU of the controller 205.

First, in step S21, the controller 205 determines whether or not an interruption cause has occurred in a job whose processing is being executed, and if an interruption cause has occurred, the procedure proceeds to step S22, but if the interruption cause has not occurred, the process of FIG. 12 is terminated. Examples of the interruption causes of a job in this case include mechanical causes such as a sheet jam during sheet transport, a problem in the fixer, and mechanical breakdowns or the like, as well as insufficient resources such as running out of sheet or the like. Moreover, causes originating in user operations are conceivable such as a door being opened or closed by a user. Any of these may be an interruption cause according to the present exemplary embodiment.

If the controller 205 determines that an interruption cause has occurred, the controller 205 interrupts the processing of the job being executed in step S22, and displays on the touch panel section 401 that an interruption cause has occurred.

Figure 13:
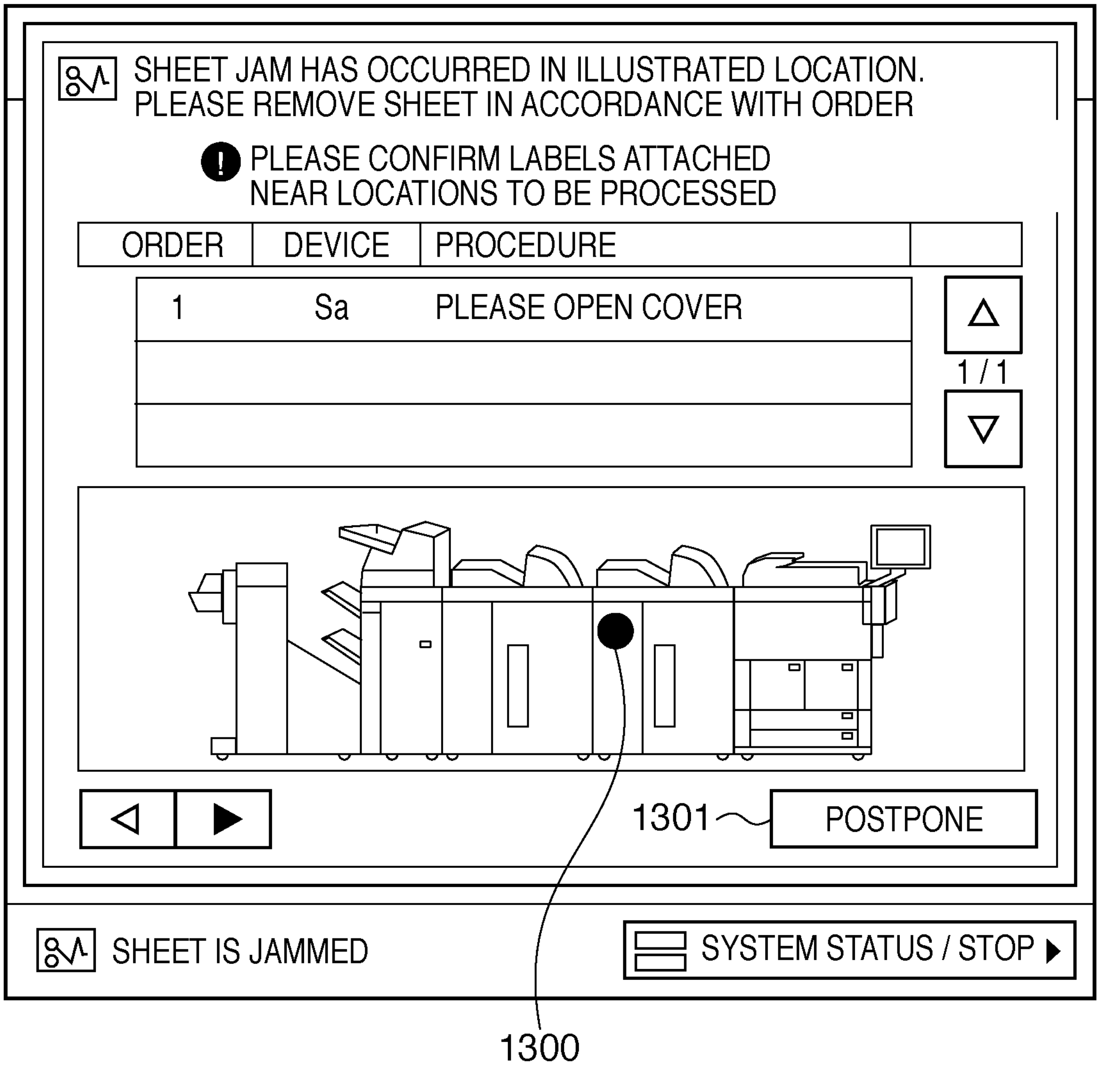
FIG. 13 is a diagram illustrating a screen example displayed in a case where a job has been interrupted due to a paper jam occurring.

FIG. 13 is a diagram illustrating a screen example displayed on the touch panel section 401 in a case where a job has been interrupted due to a sheet jam occurring.

In FIG. 13, a sheet jam has occurred and the location of the sheet jam is indicated with a mark 1300. Further still, in addition to the cause of the interruption that has occurred, this screen displays a procedure for clearing the interruption cause. Accordingly, the user is able to remove the interruption cause in accordance with the displayed procedure. Furthermore, if it is determined that a "postpone" button 1301 displayed on the job interruption screen has been pressed, the controller 205 finishes the job interruption screen. However, even though the display of this job interruption screen has finished, the interruption state continues if the interruption cause has not been cleared.

In this manner, the procedure proceeds from step S22 to step S23, and the controller 205 references the settings of the interrupted job to determine whether the interrupted job is an inline job or whether it is an offline job. If it is an inline job, the procedure proceeds to step S24, and if it is an offline job, the procedure proceeds to step S28. In step S24, the controller 205 performs management by storing the job as a job targeted for recovery allowance in the RAM 208 or the HDD 209 of the printing apparatus 100 or both of these, and maintains the interruption state. Here, recovery allowance signifies allowing a recovery process in which a process that is unfinished due to an interruption occurring in the job processing of an inline job is to be continued and executed. Next, the procedure proceeds to step S25 and the controller 205 determines whether or not the interruption cause of the inline job has been cleared. Here, in a case where it is determined that the interruption cause has been cleared, the controller 205 proceeds to step S26 for carrying out the recovery process, but in a case where it is determined that the interruption cause has not been cleared, the procedure proceeds to step S30. In step S26, in a case where the printing of the job has not been finished in the print unit 203 of the print system 1000, the controller 205 gives an instruction to carry out the printing of sheets. Furthermore, as a recovery process relating to the sheets required in post-processing, an instruction is given such as retroactively printing the required pages. For example, when double-sided printing of sheets has been set and an interruption has occurred at a time when the printing of only one side of a sheet has finished, the instruction is given not for printing only the page whose printing is unfinished, but for again printing the pages in two page units so as to carry out double-sided printing, thereby enabling the designated post-processing. Having received this instruction, the print unit 203 carries out printing of sheets for which the print instruction has been received. Furthermore, in step S26, the controller 205 not only executes the recovery process of unexecuted print processing, but also executes recovery control in which a recovery process of unexecuted post-processing (sheet processing) is executed. Here, if there is a case where the print processing of the inline job has finished but all or a part of the post-processing is unexecuted, a recovery process is executed for only the unexecuted post-processing. In this manner the procedure proceeds to step S27 and the controller 205 determines whether or not the inline job has been finished, and if it is determined that the inline job is finished, the controller 205 finishes the inline job and returns to a standby state. It should be noted that in step S27, when the controller 205 determines that the recovery process of the inline job is not finished, processing returns to step S26 and the recovery process continues.

Next, a description is given regarding a case where an interruption has occurred during execution of an offline job.

In step S28, the controller 205 cancels the offline job as a recovery-prohibited job and the procedure proceeds to step S29. In this way, in a case of an offline job, even if the interruption cause is cleared, the unexecuted post-processing (sheet processing) is not executed. Next, the procedure proceeds to step S29 and the controller 205 determines whether or not the interruption cause of the offline job has been cleared, and if it is determined that the cause has not been cleared, the procedure proceeds to step S30. Here, in a case where the user references an interruption screen of FIG. 13 for example and the interruption cause has been cleared in step S29, the controller 205 finishes the processing relating to this job.

On the other hand, in a case where it is determined in step S29 that the interruption cause has not been cleared, the controller 205 determines in step S30 whether or not there is an unexecuted job. Here, in a case where there is an unexecuted job (subsequent job), the procedure proceeds to step S31. On the other hand, in a case where there is no subsequent job, the procedure proceeds to step S25 if the job is an inline job and in a case where it is an offline job, the procedure proceeds to step S29. In step S31, the controller 205 determines whether or not there is a subsequent job (unexecuted job) having executable print settings unaffected by the interruption cause.

For example, if there is a case where an interruption cause has occurred in a sheet processing apparatus 200, for example, being caused by running out of staples in a sheet processing apparatus that carries out stapling, this is determined to be processable if the sheet processing settings of the subsequent job are not associated with stapling. Furthermore, for example, if the interruption cause originates in a sheet jam during sheet transport in the print unit 203, in a case where the subsequent job is a job involving printing, it is determined that the subsequent job cannot be executed as long as the interruption cause is not cleared. On the other hand, even if there is a sheet jam in the print unit 203, in a case where the subsequent job is an offline that does not accompany printing, it is determined that the subsequent job is executable without being affected by the interruption cause.

Furthermore, if the unexecuted job is an inline job in a case where the interrupted job is an offline job, it can be determined that the print processing of the inline job can be executed without being affected by the interruption cause of the offline job. Accordingly, in this case, the procedure proceeds to step S32 and the print processing of the inline job can be executed. If it is determined in this manner in step S31 that all the subsequent jobs will be affected by the interruption cause, the process proceeds to the processing of step S25 (inline job) or step S29 (offline job) in accordance with whether the interrupted job is an inline job or an offline job.

On the other hand, if it is determined that there is a job among the subsequent jobs that will not be affected by the interruption cause, the processing proceeds to step S32 and the controller 205 enables start of processing of the subsequent job that will not be affected by the interruption cause. Here, in a case where the subsequent job that will not be affected by the interruption cause is an inline job involving printing, the print unit 203 and the sheet processing apparatus 200, which have received an execution allowance, perform processing on the subsequent job. Furthermore, in a case where the subsequent job is an offline job, the sheet processing apparatus 200, which has received the execution allowance, performs processing on the subsequent job. After completion of the subsequent job whose execution has been allowed in step S32 in this manner, the procedure proceeds to step S25 when the interrupted job is an inline job, and it is determined whether or not the interruption cause has been cleared. And if the interrupted job is an offline job, the procedure proceeds from step S32 to step S29, and it is determined whether or not the interruption cause has been cleared.

With the above-described first exemplary embodiment, if an interruption occurs in an inline job accompanying print processing and a job is inputted that will not be affected by the interruption cause until the interruption cause is cleared, the job can be given priority and executed without waiting for the elimination of the interruption cause. Furthermore, if an interruption occurs in an offline job that does not involve print processing, the offline job is canceled and, if a subsequent job is inputted that will not be affected by the interruption cause, the subsequent job can be given priority and executed without waiting for the elimination of the interruption cause.

In this way, a problem can be solved in which, due to an interrupted job being an offline job, the processing of other jobs is needlessly delayed.

Furthermore, a problem can be prevented in which re-execution of an offline job is inadvertently attempted regardless of the interrupted job being an offline job. Conceivable problems here include troubles unintended by a user directly relating to the resultant product itself (printed sheets) to be produced by the print system and/or the print system itself.

Second Exemplary Embodiment

Next, a description is given regarding a second exemplary embodiment of the present invention. In the second exemplary embodiment, a description is given of a reflection process to a UI for post-processing settings when an offline job has been interrupted in the print system 1000. It should be noted that the configurations of the print system and the printing apparatus according to the second exemplary embodiment are the same as the configurations in the aforementioned first exemplary embodiment, and therefore description thereof is omitted.

Figure 14:
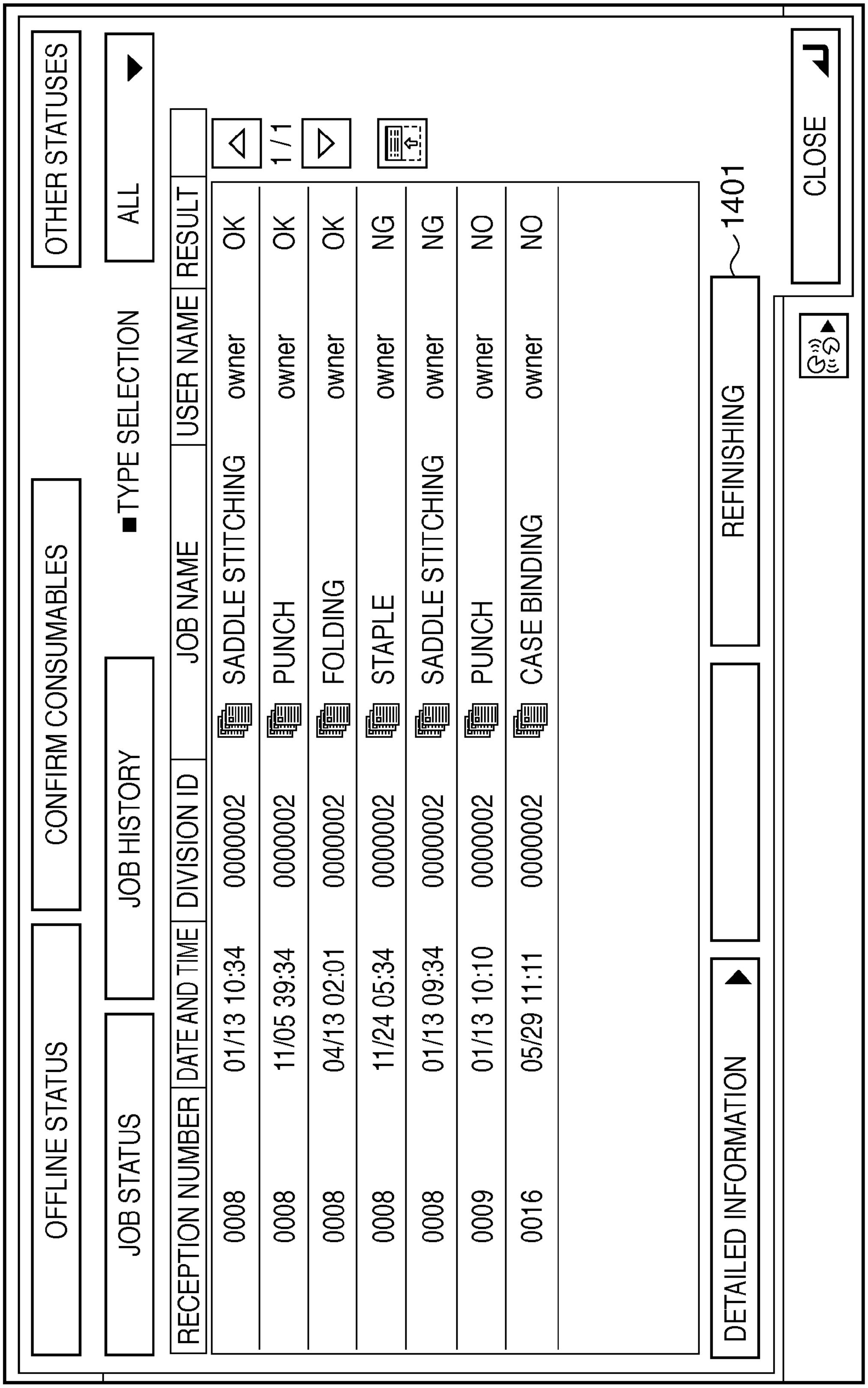
FIG. 14 is a diagram illustrating one example of a printing status screen according to a second exemplary embodiment.

FIG. 14 is a diagram illustrating one example of a status screen of an offline job according to the second exemplary embodiment.

Here, a list of offline jobs is displayed, and a result being "NG" indicates an offline job that has been interrupted. In this way, this screen discernibly indicates jobs that have been interrupted.

Here, if a finishing button 1401 is pressed, then the controller 205 copies the post-processing settings of the interrupted job to the settings of the offline job setting UI 900 shown in FIG. 9. Then, the controller 205 reflects the copied settings in the display of the offline job setting UI 900. Then, when it is determined that the start key 503 of the console unit 204 has been pressed, the controller 205 causes the processing of the offline job being displayed on the offline job setting UI 900 to be carried out in the sheet processing apparatus 200.

As described above, with the second exemplary embodiment, the user can reuse the sheet processing (post-processing) settings of the interrupted offline job to execute sheet processing that is unprocessed due to the interruption. This reduces the time and effort in re-performing the settings for an unsuccessful offline job and enables the offline job to be re-executed easily, and therefore improves the usability for the user.

Third Exemplary Embodiment

Next, description is given regarding a recovery process for an interrupted offline job according to a third exemplary embodiment of the present invention. It should be noted that the configurations of the print system and the printing apparatus according to the third exemplary embodiment are the same as the configurations in the aforementioned first exemplary embodiment, and therefore description thereof is omitted.

Figure 15:
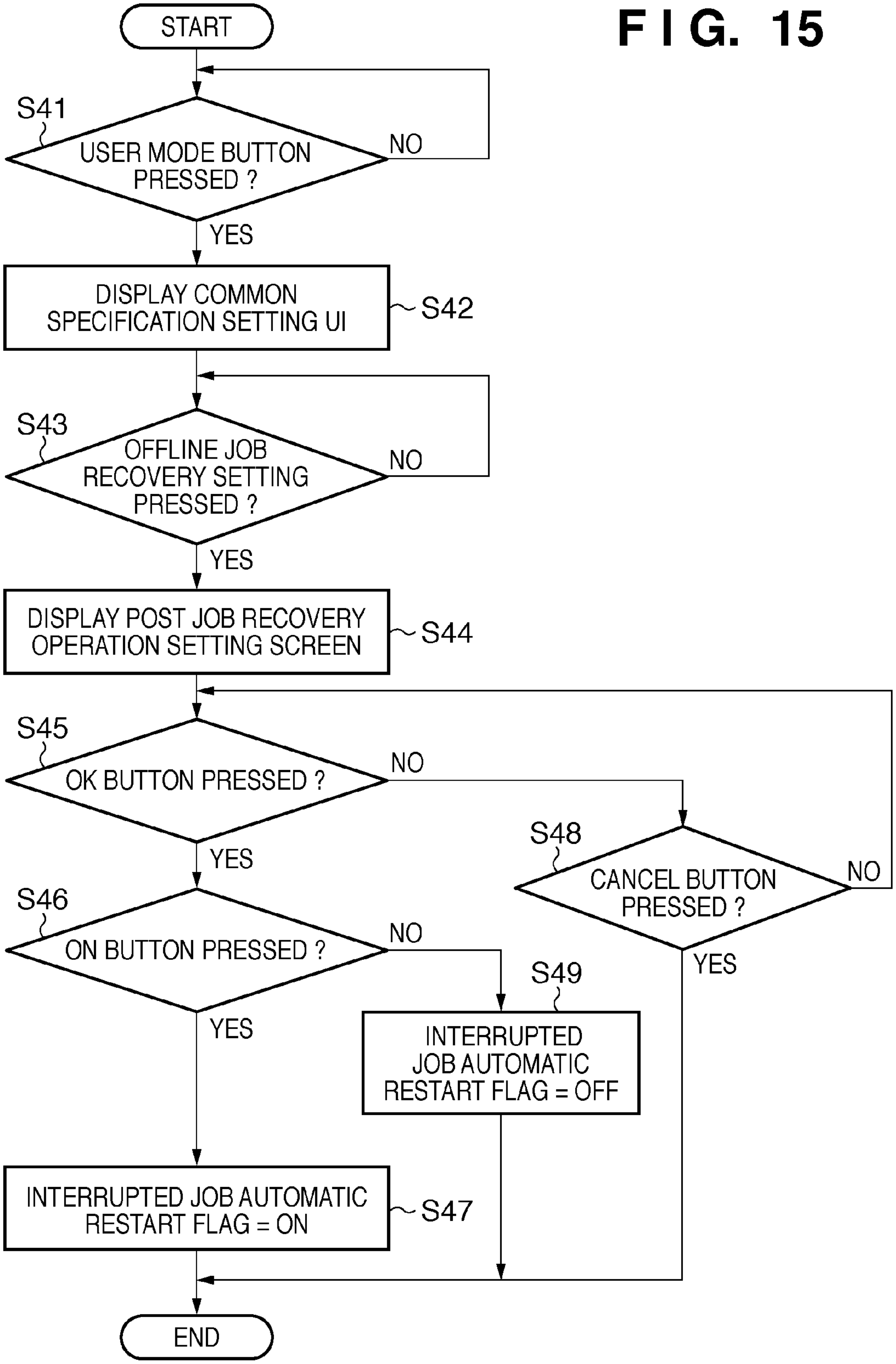
FIG. 15 is a flowchart describing a recovery process for an offline job in the print system according to a third exemplary embodiment.

FIG. 15 is a flowchart describing a recovery process for an offline job in the print system according to the third exemplary embodiment. It should be noted that a program for executing this process is stored in the ROM 207 and executed under the control of a CPU of the controller 205.

First, in step S41, the controller 205 determines whether or not a user mode setting button 505 (FIG. 4) has been pressed on the touch panel section 401. If it is determined that the user mode setting button 505 has been pressed, then the procedure proceeds to step S42, and a common specification setting screen 1600 shown in FIG. 16 is displayed.

Figure 16:
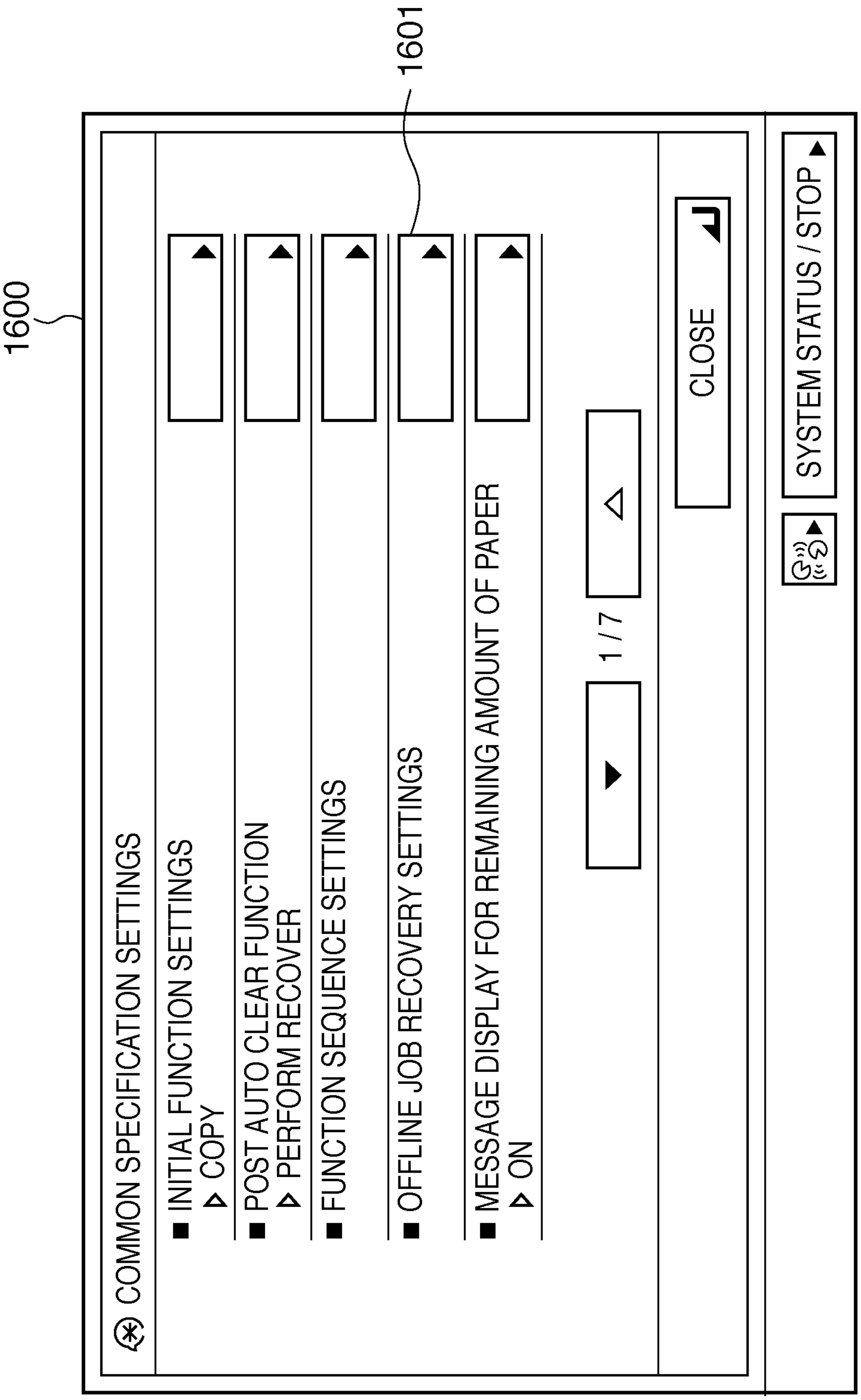
FIG. 16 is a diagram illustrating a display example of a common specification setting screen according to the third exemplary embodiment.

FIG. 16 is a diagram illustrating a display example of the common specification setting screen according to the third exemplary embodiment.

This screen is displayed on the touch panel section 401 and is provided with an offline job recovery setting button 1601 for designating various settings to carry out a recovery process for an offline job.

Next, the procedure proceeds from step S42 to step S43 and the controller 205 determines whether or not the offline job recovery setting button 1601 on the common specification setting screen 1600 has been pressed. If the offline job recovery setting button 1601 has been pressed, the procedure proceeds to step S44 and the controller 205 displays a post job recovery operation setting screen 1700 shown in FIG. 17.

Figure 17:
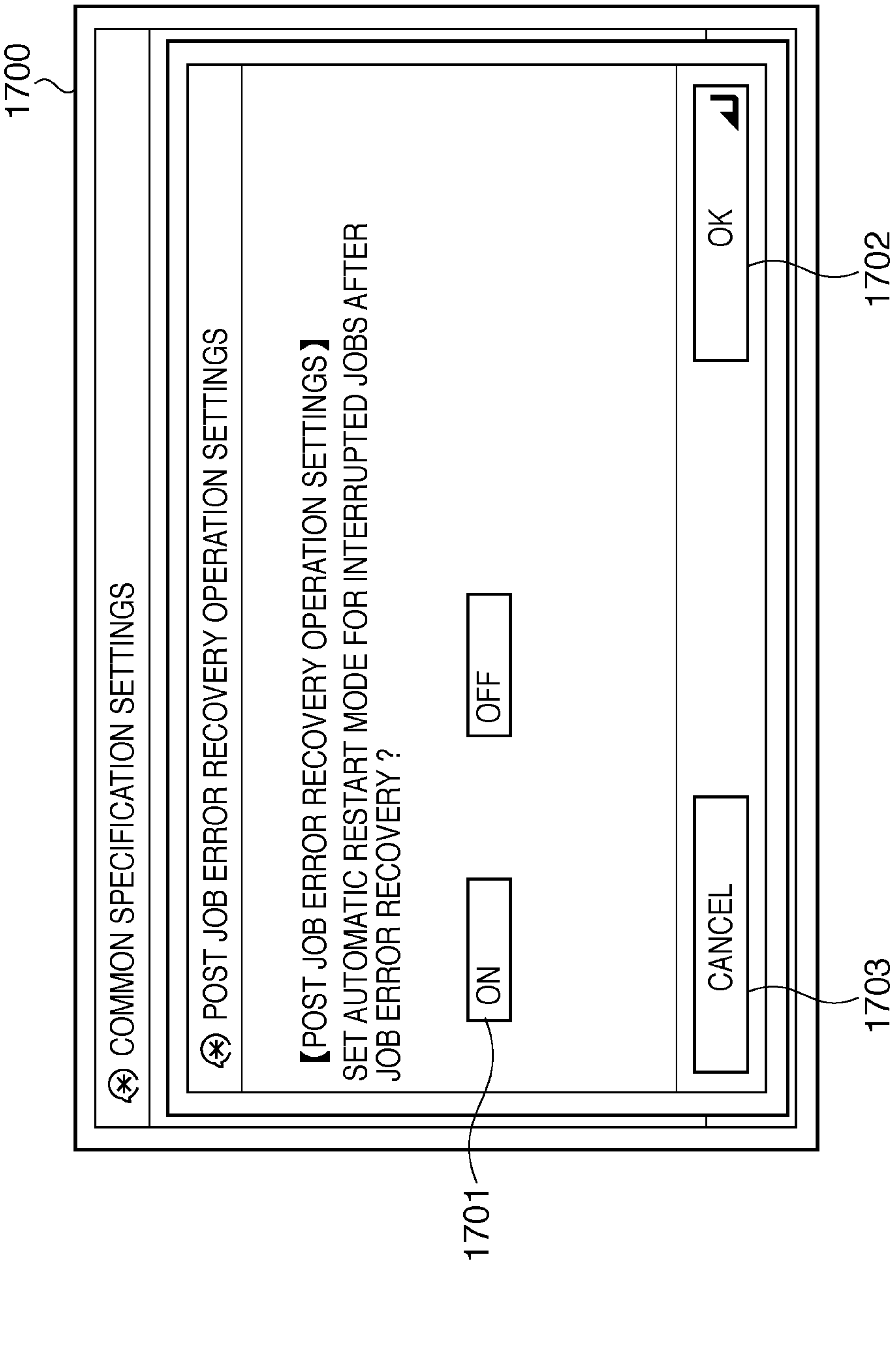
FIG. 17 is a diagram illustrating a display example of a post job recovery operation setting screen for an offline recovery process according to the third exemplary embodiment.

FIG. 17 is a diagram illustrating a display example of the post job recovery operation setting screen for an offline recovery process according to the third exemplary embodiment.

Here, settings can be performed as to whether or not to automatically restart after job recovery an offline job that has been interrupted.

Next, the procedure proceeds to step S45 and the controller 205 determines whether or not an OK button 1702 on the post job recovery operation setting screen 1700 has been pressed. If the OK button 1702 has not been pressed, the procedure proceeds to step S48 and it is determined whether or not a cancel button 1703 has been pressed. This process finishes if the cancel button 1703 is pressed, but if this has not happened, the procedure returns to step S45. If the OK button 1702 is pressed in step S45, the procedure proceeds to step S46 and it is determined whether or not an ON button 1701 has been pressed to set an automatic restart mode for interrupted jobs, and if this is the case the procedure proceeds to step S47 and an interrupted job automatic restart flag is set to ON. On the other hand, if the automatic restart mode for interrupted jobs has not been set, the procedure proceeds to step S49 and the interrupted job automatic restart flag is set to OFF and processing is finished. The interrupted job automatic restart flag is stored in the RAM 208.

Figure 18:
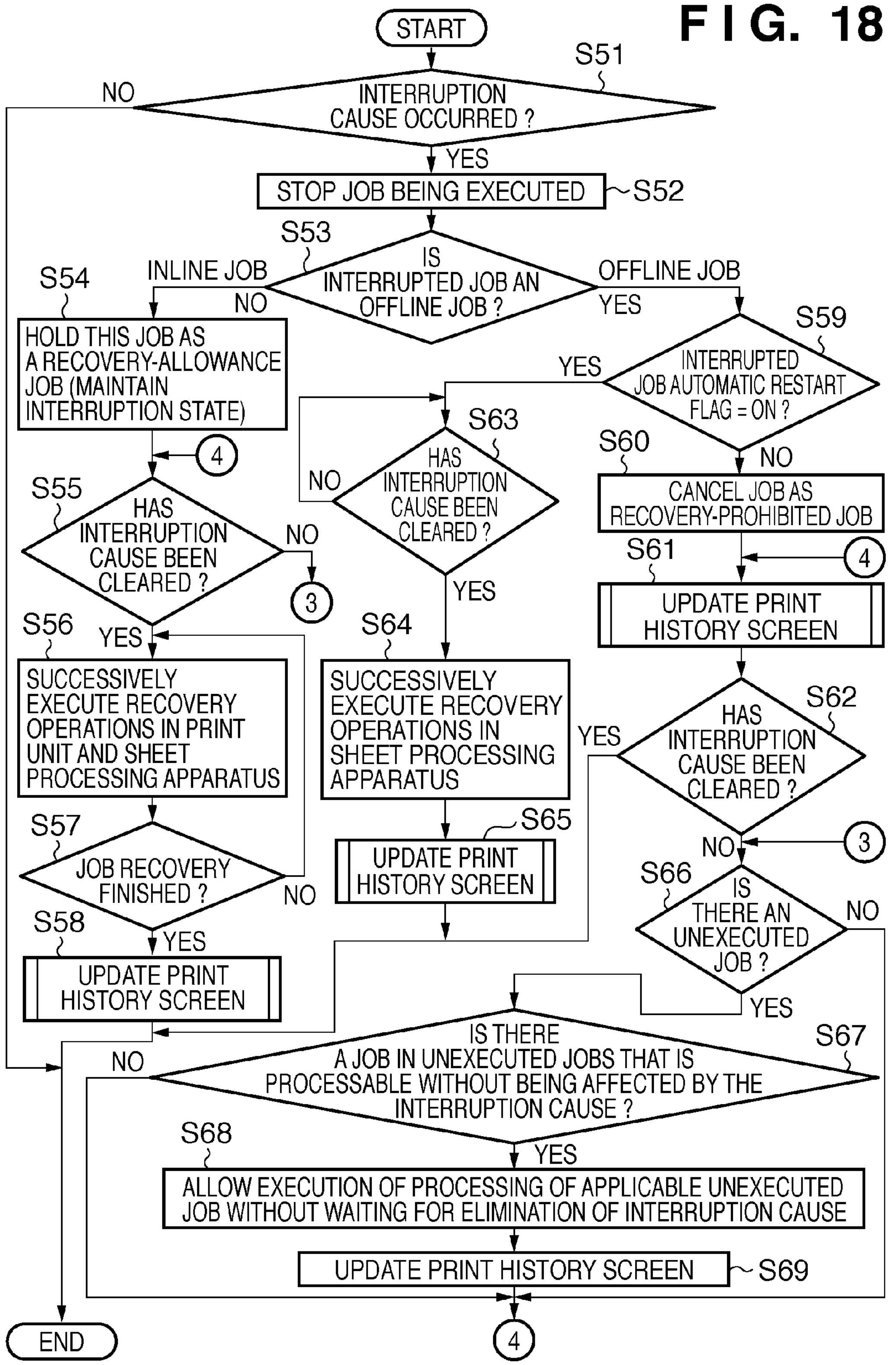
FIG. 18 is a flowchart describing processing in a case where a job interruption has occurred in the print system according to the third exemplary embodiment.

FIG. 18 is a flowchart describing processing in a case where a job interruption has occurred in the print system according to the third exemplary embodiment. It should be noted that a program for executing this process is stored in the ROM 207 and executed under the control of a CPU of the controller 205. In the third exemplary embodiment, in a case where the interrupted job automatic restart flag is ON, a job is not canceled when designated by the user, even if the interrupted job is an offline job. It should be noted that in FIG. 18, steps S51 to S57, S60, S62, and S66 to S68 are common to the steps S21 to S27, S28, S29, and S30 to S32 of the above-described FIG. 12, and therefore description is simplified.

First, in step S51, the controller 205 determines whether or not an interruption cause has occurred in a job whose processing is being executed, and if it is determined that an interruption cause has occurred, the procedure proceeds to step S52 and the processing of the job being executed is stopped. When the job is stopped, the controller 205 displays on the touch panel section 401 a screen indicating that the job has been interrupted, as shown in the above-described FIG. 13. Next, the procedure proceeds to step S53 and the controller 205 references the settings of the interrupted job to determine whether the interrupted job is an inline job or an offline job. In a case of an inline job, the procedure proceeds to step S54 and the controller 205 performs management by storing that inline job as a job targeted for recovery allowance in the RAM 208 or the HDD 209 of the printing apparatus 100 or both of these, and maintains the interruption state. Then, in step S55, the controller 205 determines whether or not the interruption cause of the job has been cleared, and if the interruption cause has been cleared, the procedure proceeds to step S56 for carrying out recovery processing. On the other hand, in a case where the interruption cause has not been cleared, the procedure proceeds to step S66. In step S56, in a same manner as the above-described step S26 (FIG. 12), the controller 205 gives an instruction to print pages whose printing has not been finished for the job by the print unit 203 and gives an instruction for unprocessed sheet processing to be carried out in the sheet processing apparatus 200. When all the recovery processes have been finished in this manner, the procedure proceeds from step S57 to step S58, and the controller 205 updates a print history screen, finishes processing relating to the inline job, and returns to a standby state.

On the other hand, if it is determined in step S53 that the interrupted job is an offline job, the procedure proceeds to step S59 and the controller 205 determines whether or not the interrupted job automatic restart flag has been set to ON. If it is determined that the flag is ON, that is, if the automatic restart mode has been set, the procedure proceeds to step S63 and the controller 205 sets the interrupted job automatic restart flag to OFF, then determines whether or not interruption cause of the offline job has been cleared. Here, if it is determined that the interruption cause is eliminated, the procedure proceeds to step S64 and a recovery process is executed in which unprocessed sheet processing is executed by the sheet processing apparatus 200. Then the procedure proceeds to step S65 and the controller 205 updates the print history screen, finishes processing relating to the offline job, and returns to a standby state.

On the other hand, if the interrupted job automatic restart flag is not ON in step S59, the offline job is cancelled as a recovery-prohibited job in step S60 in a same manner as step S29 onward in the above-described FIG. 12. Next, the procedure proceeds to step S61 and the print history screen is updated. Next, the procedure proceeds to step S62 and the controller 205 determines whether or not the interruption cause of the offline job has been cleared. In a case where the user has cleared the interruption cause, the controller 205 finishes processing relating to this offline job.

On the other hand, in a case where the interruption cause has not been cleared in step S62, in a same manner as the above-described FIG. 12, the controller 205 determines in step S66 whether there is a subsequent job after this job. In a case where there is a subsequent job, the procedure proceeds to step S67. In a case where there is no subsequent job in step S66, the procedure proceeds to step S55 if the job is an inline job and if it is an offline job, the procedure proceeds to step S62. In a case where there is a subsequent job, the controller 205 determines in step S67 whether or not there is a subsequent job having executable print settings unaffected by the interruption cause in a same manner as the above-described step S31. Here, if it is determined that all the subsequent jobs will be affected by the interruption cause, the controller 205 proceeds to step S55 if the job being interrupted is an inline job, and proceeds to step S62 if this job is an offline job. On the other hand, if it is determined in step S67 that there is a job among the subsequent jobs that will not be affected by the interruption cause, the procedure proceeds to step S68 and the controller 205 allows processing of the subsequent job that will not be affected by the interruption cause. Then, the procedure proceeds to step S69, the print history is updated, and the procedure proceeds to step S55 or step S62 in accordance with whether it is an inline job or an offline job being interrupted.

As described above, according to the third exemplary embodiment, even in a case where an offline job has been interrupted, the interrupted offline job can be automatically restarted in accordance with instructions selected by a user when the interruption cause is cleared. By enabling a user to select automatic restarting from an interruption in an offline job in this manner, it is possible to prevent occurrences of troubles unintended by the user due to interrupted offline jobs being inadvertently restarted.

Other Exemplary Embodiments

It should be noted that the present invention may also be accomplished by supplying a software program that achieves the functions of the foregoing exemplary embodiments directly or remotely in a system or a device, and having a computer of the system or device read out and execute the supplied program. In this case, there is no need for the embodiment to be a program as long as the functionality of a program is present.

Furthermore, the functionality of the foregoing exemplary embodiments, which is achieved by having a computer execute the program that has been read out from a storage medium in which a software program that achieves the functionality of the aforementioned exemplary embodiments has been stored, may additionally be achievable by other embodiments. For example, an OS or the like that runs on a computer may carry out a part or all of the actual processing according to instructions of the program such that the functionality of each of the above-described exemplary embodiment is achieved by the processing thereof.

Further still, the program that is read out from the storage medium may be written onto a memory provided in an extension board inserted into the computer or an extension unit connected to the computer. In this case, a CPU or the like provided in the extension board or extension unit may subsequently carry out a part or all of the actual processing according to instructions of the program such that the functionality of the foregoing exemplary embodiment is achieved by the processing thereof.

Furthermore, in the above-described exemplary embodiments, embodiments were described in which the functionality of the above-described exemplary embodiments was achieved by the controller 205 installed in the printing apparatus 100 of the print system 1000. In this way, in a configuration in which an apparatus applied as a sheet processing apparatus 200 is connected to the printing apparatus 100 as an option, the configurations of each of the above-described exemplary embodiments can be achieved based on the printing apparatus 100. In this way, by organizing a setup based on the printing apparatus 100 itself, an effect can be obtained of being able to support various system configurations. Note however that configurations other than this are possible. For example, by having controllers of apparatuses (including 107, 108, 109, and 200 or the like) separate from the printing apparatus 100 such as the computer 103 or 104 perform functions instead of the controller 205, a configuration is possible that achieves the setup of each of the above-described exemplary embodiments. By configuring in this manner, an effect of the exemplary embodiments capable of flexibly supporting various print environments can be further improved. It should be noted these are examples shown for illustration and there is no limitation to these.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-175907, filed Jul. 4, 2008 which is hereby incorporated by reference herein in its entirety.

What is claimed is:

1. A print system comprising:

a printing apparatus;

a post processing apparatus that receives materials from the printing apparatus and executes post-processing using the received materials;

a post-process execution unit that, if an offline job execution request for requesting an offline job that does not require print processing by the printing apparatus but requires post-processing by the post-processing apparatus has been received, causes the post-processing apparatus to execute the post-processing using materials without causing the printing apparatus to execute print processing;

an inline job control unit that, if an inline job execution request for requesting an inline job that requires printing by the printing apparatus and post-processing by the post-processing apparatus has been received, causes the printing apparatus to execute print processing and the post-processing apparatus to execute the post-processing using materials printed by the printing apparatus and received from the printing apparatus;

a display unit that displays a screen indicating that an error occurs in the offline job in a case where the error occurs in the offline job, or a screen indicating that the error occurs in the inline job in a case where the error occurs in the inline job; and a recovery control unit that, in a case where an error occurs in the inline job, allows a recovery process for carrying out unfinished processing in the inline job, wherein the recovery control unit does not allow a recovery process for carrying out unfinished processing in the offline job in a case where the error occurs in the offline job.

2. The print system according to claim 1, further comprising:

a condition display unit that displays a post-processing condition relating to post-processing of the offline job in which the error occurs, in a case where the error occurs in the offline job; and an execution unit that, based on the displayed post-processing condition, enables execution of post-processing by the post-processing apparatus based on the post-processing condition for another offline job different from the offline job.

3. The print system according to claim 1, further comprising:

a determination unit that, if there is a job in which an error occurs, determines whether or not there is another offline job or inline job that is executable while the cause of the error is not cleared; and a starting unit that enables the another offline job or inline job determined by the determination unit to be started by the printing apparatus or the post-processing apparatus without waiting for an elimination of the cause of the error.

4. The print system according to claim 1, further comprising a job launch unit that, if an error occurs in the offline job, automatically launches print processing of an inline job by the printing apparatus if the inline job is designated before the offline job.

5. The print system according to claim 1, wherein the recovery control unit allows the recovery process to start automatically on a condition of an elimination of the cause of error in a case where the error occurs in the inline job, and prohibits the recovery process to start automatically even if the cause of the error is eliminated in a case where the error occurs in the offline job.

6. The print system according to claim 1, further comprising:

a designation unit that inputs a designation for allowing the recovery process for the offline job if the cause of the error has been eliminated in a case where the error occurs in the offline job, wherein, in response to the designation by the designation unit, the recovery control unit allows the recovery process for the offline job.

7. The print system according to claim 1, further comprising an unfinished processing display unit that discernibly displays an unfinished post-process in the offline job in a case where an error occurs in the offline job.

8. A print control method of a print system having a printing apparatus and a post-processing apparatus which receives materials from the printing apparatus and executes post-processing using materials, comprising:

a post-process execution step of, if an offline job execution request for requesting an offline job that does not require print processing by the printing apparatus but requires post-processing by the post-processing apparatus has been received, causing the post-processing apparatus to execute the post-processing using materials without causing the printing apparatus to execute print processing;

an inline job control step of, if an inline job execution request for requesting an inline job that requires printing by the printing apparatus and post-processing by the post-processing apparatus has been received, causing the printing apparatus to execute print processing and the post-processing apparatus to execute the post-processing using materials printed by the printing apparatus and received from the printing apparatus;

a display step of displaying a screen indicating that an error occurs in the offline job in a case where the error occurs in the offline job, or a screen indicating that the error occurs in the inline job in a case where the error occurs in the inline job; and a recovery control step of, in a case where an error occurs in the inline job, allowing a recovery process for carrying out unfinished processing in the inline job, wherein the recovery control step does not allow a recovery process for carrying out unfinished processing in the offline job in a case where the error occurs in the offline job.

9. The print control method according to claim 8, further comprising:

a step of displaying a post-processing condition relating to post-processing of the offline job in which the error occurs, in a case where the error occurs in the offline job; and a step of, based on the displayed post-processing condition, enabling execution of post-processing by the post-processing apparatus based on the post-processing condition for another offline job different from the offline job.

10. The print control method according to claim 8, further comprising:

a determination step of, if there is a job which an error occurs, determining whether or not there is another offline job or inline job that is executable while the cause of the error is not cleared; and a step of enabling the another offline job or inline job determined in the determination step to be started by the printing apparatus or the post-processing apparatus without waiting for an elimination of the cause of the error.

11. The print control method according to claim 8, further comprising a step of, if an error occurs in the offline job, automatically launching print processing of an inline job by the printing apparatus if the inline job is designated before the offline job.

12. The print control method according to claim 8, wherein in the recovery control step, in a case where the error occurs in the inline job, the recovery process is allowed to start automatically on a condition of an elimination of the cause of the error, and in a case where the error occurs in the offline job, the recovery process is prohibited to start automatically even if the cause of the error is eliminated.

13. The print control method according to claim 8, further comprising a designation step of inputting a designation for allowing the recovery process for the offline job if the cause of the error has been eliminated in a case where the error occurs in the offline job, wherein, in response to the designation in the designation step, the recovery control step allows the recovery process for the offline job.

14. The print control method according to claim 8, further comprising a step of discernibly displaying to a user an unfinished post-process in the offline job in a case where an error occurs in the offline job.

15. A non-transitory computer-readable storage medium storing a program for causing a computer to implement a print control method of a print system having a printing apparatus and a post-processing apparatus which receives materials from the printing apparatus and executes post-processing using the received materials, the method comprising:

a post-process execution step of, if an offline job execution request for requesting an offline job that does not require print processing by the printing apparatus but requires post-processing by the post-processing apparatus has been received, causing the post-processing apparatus to execute the post-processing using materials without causing the printing apparatus to execute print processing;

an inline job control step of, if an inline job execution request for requesting an inline job that requires printing by the printing apparatus and post-processing by the post-processing apparatus has been received, causing the printing apparatus to execute print processing and the post-processing apparatus to execute the post-processing using materials printed by the printing apparatus and received from the printing apparatus;

a display step of displaying a screen indicating that an error occurs in the offline job in a case where the error occurs in the offline job, or a screen indicating that the error occurs in the inline job in a case where the error occurs in the inline job; and a recovery control step of, in a case where an error occurs in the inline job, allowing a recovery process for carrying out unfinished processing in the inline job, wherein the recovery control step does not allow a recovery process for carrying out unfinished processing in the offline job in a case where the error occurs in the offline job.

16. The print system according to claim 1, wherein the recovery control unit cancels the offline job in a case that the error occurs in the offline job.

17. The print system according to claim 1, wherein the offline job and the inline job include a staple processing as the post-processing by the post-processing apparatus, wherein the recovery control unit automatically executes a recovery process for carrying out unfinished processing including the staple processing in the inline job in a case that the error occurs in the inline job, and the recovery control unit does not automatically execute a recovery process for carrying out unfinished processing including the staple processing in the offline job in a case that the error occurs in the offline job.

18. The print system according to claim 1, wherein the error includes any one of a sheet jam during sheet transport, a problem in a fixer, mechanical breakdowns, a running out of sheet and a running out of ink in the printing apparatus, wherein the recovery control unit automatically executes a recovery process for carrying out unfinished processing of the inline job in a case that the error occurs in the inline job, and the recovery control unit does not automatically execute a recovery process for carrying out unfinished processing of the offline job in a case that the error occurs in the offline job.

* * * * *